(12) United States Patent
Gegout et al.

(10) Patent No.: US 11,787,568 B2
(45) Date of Patent: Oct. 17, 2023

(54) METHOD FOR ESTIMATING COLLISION BETWEEN AT LEAST ONE PIECE OF SPACE DEBRIS AND A SATELLITE

(71) Applicant: AIRBUS DEFENCE AND SPACE SAS, Toulouse (FR)

(72) Inventors: Dorian Gegout, Toulouse (FR); Lara Hue, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/927,655

(22) PCT Filed: May 25, 2021

(86) PCT No.: PCT/EP2021/063905
§ 371 (c)(1),
(2) Date: Nov. 23, 2022

(87) PCT Pub. No.: WO2021/239732
PCT Pub. Date: Dec. 2, 2021

(65) Prior Publication Data
US 2023/0211896 A1 Jul. 6, 2023

(30) Foreign Application Priority Data

May 25, 2020 (FR) ...................................... 2005477

(51) Int. Cl.
*B64G 1/24* (2006.01)
*B64G 1/68* (2006.01)
(52) U.S. Cl.
CPC ............... *B64G 1/242* (2013.01); *B64G 1/68* (2013.01)

(58) Field of Classification Search
CPC .................................. B64G 1/242; B64G 1/68
See application file for complete search history.

(56) References Cited

U.S. PATENT DOCUMENTS 6,726,153 B1 * 4/2004 Campbell .............. B64G 1/407
244/172.6
2008/0033648 A1 * 2/2008 Kelly ....................... G08G 5/04
701/301

(Continued)

OTHER PUBLICATIONS

Earth-Crossing Asteroid Intercept Mission with a Solar Sail Spacecraft Xiangyuan Zeng, Shengping Gong, Junfeng Li Tsinghua University, Beijing, Oct. 2014 (Year: 2014).*

(Continued)

*Primary Examiner* — Donald J Wallace
*Assistant Examiner* — Jalal C Coduroglu
(74) *Attorney, Agent, or Firm* — Nixon & Vanderhye P.C.

(57) ABSTRACT

A method for estimating collision between a satellite in orbit and at least one piece of space debris having a time of closest approach to the satellite is disclosed including: obtaining the reference orbit of the satellite; determining an ephemeris of state transition data representative of the trajectory of the reference orbit; communicating the reference orbit and the ephemeris of state transition data to the satellite. The method includes the steps on board the satellite of: determining the true orbital position of the satellite; propagating the true orbit; calculating a probability of collision between the satellite and the piece of debris.

13 Claims, 7 Drawing Sheets

(56) References Cited

U.S. PATENT DOCUMENTS

| | | | | |
|---|---|---|---|---|
| 2013/0292517 | A1* | 11/2013 | Briskman | B64G 1/10 |
| | | | | 244/158.8 |
| 2015/0134295 | A1* | 5/2015 | Kim | B64G 99/00 |
| | | | | 702/152 |
| 2016/0347482 | A1* | 12/2016 | Dimpfl | B64G 3/00 |
| 2018/0346153 | A1* | 12/2018 | Kaplan | B64G 1/242 |
| 2019/0050136 | A1* | 2/2019 | Alfano | G01S 13/933 |
| 2020/0112378 | A1* | 4/2020 | Holzheimer | H04B 10/691 |
| 2020/0354089 | A1* | 11/2020 | Yakimenko | B64G 1/10 |
| 2021/0403183 | A1* | 12/2021 | Weiss | G01S 13/933 |
| 2022/0227503 | A1* | 7/2022 | Barnhart | G08G 5/04 |
| | | | | 701/301 |

OTHER PUBLICATIONS

2017 IEEE Aerospace Conference Technical Cosponsors—Yellowstone Conference Center, Big Sky, Montana—Mar. 4-11, 2017 (Year: 2017).*

International Preliminary Report on Patentability for PCT/EP2021/063905 dated Aug. 25, 2022, 27 pages.

International Search Report and English Translation for PCT/EP2021/063905 dated Aug. 13, 2021, 5 pages.

Written Opinion of the ISA for PCT/EP2021/063905 dated Aug. 13, 2021, 11 pages.

* cited by examiner

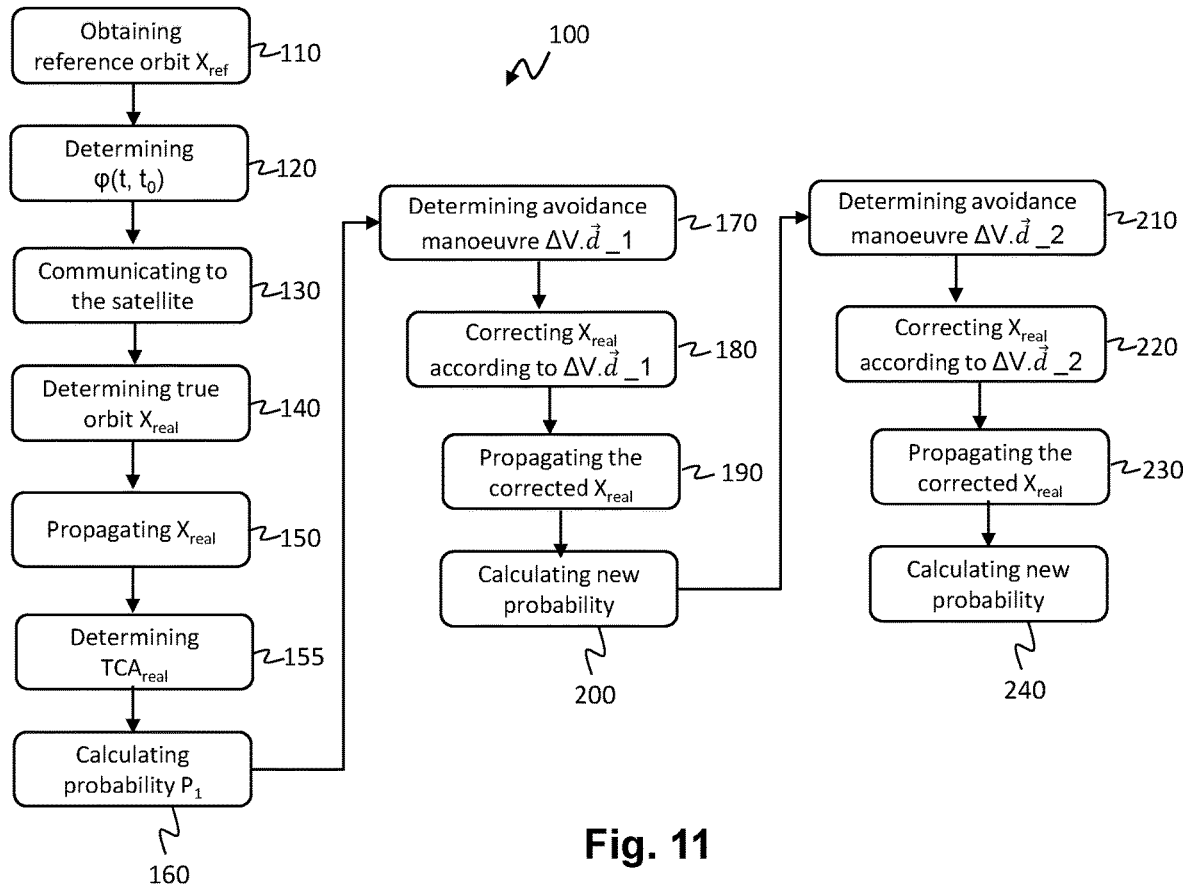
Fig. 11
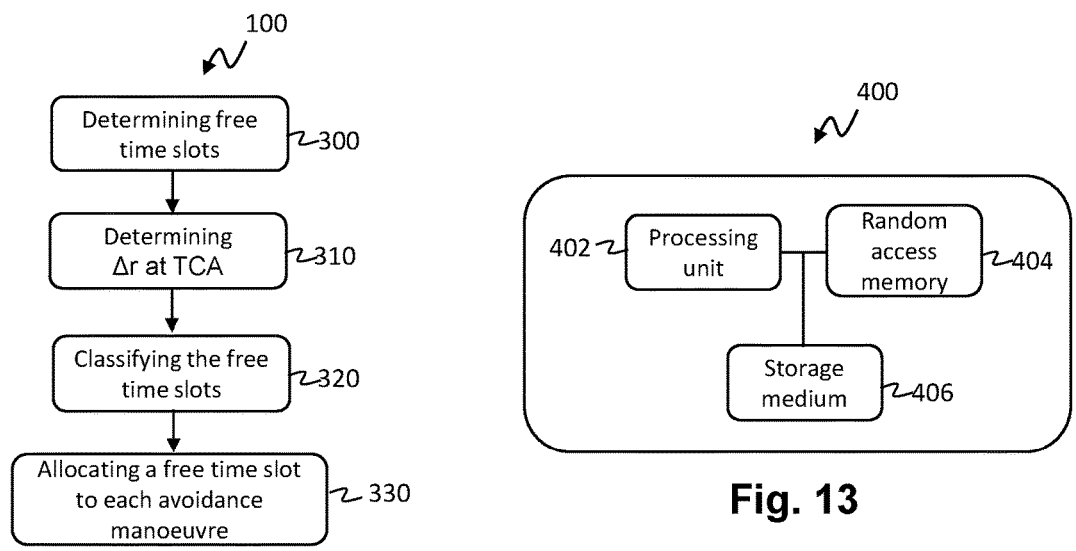
Fig. 12
Fig. 13

METHOD FOR ESTIMATING COLLISION BETWEEN AT LEAST ONE PIECE OF SPACE DEBRIS AND A SATELLITE

CROSS REFERENCE TO RELATED APPLICATIONS

The present application is a National Phase of International Application Number PCT/EP2021/063905 filed May 25, 2021, which designated the U.S. and claims priority benefits from French Application Number FR2005477 filed May 25, 2020, the entire contents of each of which are hereby incorporated by reference.

TECHNICAL FIELD OF THE INVENTION

The present invention relates to a method for estimating collision between at least one piece of space debris and a satellite in orbit around the Earth. More particularly, the present invention relates to a method allowing a satellite in Earth orbit to be able to autonomously calculate, on board the satellite, its probability of collision with at least one piece of space debris as well as manoeuvres of avoiding the at least one piece of space debris.

PRIOR ART

The current context is marked by an increase in mega-constellation projects, where up to 1000 satellites can be operated. In addition, the number of pieces of tracked debris is likely to increase sharply: the population of pieces of tracked debris will increase from 20 000 to 100 000 objects when the radar surface of the detected pieces of debris increases from 10 to 5 cm. These two phenomena will lead to a higher number of calculations of the probability of collision with the pieces of debris and therefore also of calculations of manoeuvres to avoid pieces of debris, thus increasing the workload of the operators on the ground.

It is known to evaluate a probability $P_1$ of collision between a satellite and a piece of space debris in several ways according to the thesis presented and defended on December ten, two thousand and fifteen by Romain Serra, entitled "Proximity operations in orbit: evaluation of the risk of collision and calculation of optimal manoeuvres for avoidance and rendezvous", said thesis being publicly accessible in particular via the website "archives-ouvertes.fr" under the reference tel-01261497. Document US2008/0033648 which describes a method for determining an avoidance manoeuvre is known. However, this method requires significant calculation power, which limits its effectiveness.

DISCLOSURE OF THE INVENTION

The present invention aims at overcoming these disadvantages with a totally innovative approach.

The object of the present invention is a method for estimating collision between a satellite in orbit around the Earth and at least one piece of space debris, the method including the steps implemented by information processing means on the ground, of:
  obtaining a reference orbit of the satellite and its covariance and an orbit of the piece of space debris and its covariance;
  determining at least one state transition matrix allowing propagation of the orbit of the satellite and its covariance at a time of closest approach;
  communicating the reference orbit of the satellite and its covariance, the orbit of the piece of space debris and its covariance, and said state transition matrix to the satellite;
the method including the steps, implemented by calculation means on board the satellite, of:
  determining in real time a true orbit of the satellite by a navigation device of the satellite;
  propagating the true orbit of the satellite and its covariance, as well as the orbit of the piece of space debris and its covariance, up to the time of closest approach according to said state transition matrix and the reference orbit of the satellite;
  calculating a first probability of collision between the satellite and said piece of space debris according to orbital positions of the satellite and of the piece of debris at the time of closest approach so as to evaluate the need to modify the orbital trajectory of the satellite, an orbital position of the satellite and respectively of the piece of space debris being obtained from the orbit of the satellite and respectively of the piece of space debris.

According to one feature, the method according to the invention further includes a step implemented by the calculation means on board the satellite preceding the step of calculating the first probability of collision, of:
  determining the time of closest approach corresponding to a real time of closest approach, by successively incrementing, from a reference time of closest approach predetermined by the information processing means on the ground and transmitted beforehand to the satellite, a time shift verifying, at the real time of closest approach, a result which is almost zero of the scalar product of a difference between a true orbital position of the satellite and an orbital position of the piece of space debris with a difference between a true orbital speed of the satellite and an orbital speed of the piece of space debris, the orbital position and the orbital speed of the satellite and respectively of the piece of space debris being obtained from the orbit of the satellite and respectively of the piece of space debris.

According to another feature of the invention, the step of calculating the first probability of collision, implemented by calculation means on board the satellite, comprises maximising the first probability of collision by dilution of covariances of the orbital positions of the satellite and said piece of space debris.

According to another feature, the method according to the invention further comprises the steps implemented by calculation means on board the satellite, when the first collision probability is greater than a predefined collision probability threshold:
  determining a first manoeuvre to avoid said piece of space debris at a time of the first avoidance manoeuvre predetermined according to a first thrust of the satellite optimising the radial separation from the true orbit of the satellite;
  correcting the true orbital position of the satellite at the time of the first avoidance manoeuvre according to a first orbital correction dependent on the thrust vector of the satellite relating to the first avoidance manoeuvre;
  propagating a second corrected true orbit of the satellite from the corrected true orbital position and its covariance up to the time of closest approach according to said state transition matrix and the reference orbit of the satellite;

calculating a second probability of collision between the satellite and said piece of space debris at the time of closest approach according to the second true orbit of the satellite.

According to another feature, the method according to the invention in addition comprises the steps implemented by calculation means on board the satellite, when the second probability of collision is greater than the predefined collision probability threshold, of:

determining a second manoeuvre to avoid said piece of space debris at a second time of avoidance manoeuvre predetermined according to a second thrust of the satellite optimising the radial separation from the second true orbit of the satellite;

correcting the orbital position of the satellite on the second true orbit, at the time of the second avoidance manoeuvre according to a second orbital correction dependent on the thrust vector of the satellite relating to the second avoidance manoeuvre;

propagating a third corrected true orbit of the satellite from the corrected orbital position of the satellite in the previous step and its covariance up to the time of closest approach according to said state transition matrix and the reference orbit of the satellite;

calculating a third probability of collision between the satellite and said piece of space debris at the time of closest approach according to the third true orbit of the satellite.

According to another feature of the invention, the time of the avoidance manoeuvres takes place according to an argument of the latitude of manoeuvre opposed to the argument of the latitude of collision with the piece of space debris.

According to another feature of the invention, the time of the avoidance manoeuvres is determined according to the steps of:

determining a plurality of free manoeuvre time slots each allowing the execution of a manoeuvre to avoid said piece of space debris;

allocating to each avoidance manoeuvre a manoeuvre time during a determined free time slot of a manoeuvre distinct from another free time slot of another avoidance manoeuvre.

According to another feature of the invention, the allocation step comprises the steps of:

determining the maximum possible radial separation between the satellite and the piece of space debris at the time of closest approach on each of the determined free manoeuvre slots;

classifying the free time slots according to a rating representative of the radial separation determined for each free manoeuvre slot;

the allocation step including the allocation to each avoidance manoeuvre, of the free time slot of a manoeuvre with the best determined rating distinct from the free time slot of another avoidance manoeuvre.

According to another feature of the invention, each avoidance manoeuvre includes the direction relating to the maximum radial separation associated with the free manoeuvre time slot allocated to each avoidance manoeuvre.

According to another feature of the invention, each avoidance manoeuvre includes a maximum authorised speed difference during the free manoeuvre time slot allocated to each avoidance manoeuvre.

According to another feature of the invention, orbital correction relating to each avoidance manoeuvre is determined according to the steps of:

propagating the true orbit of the satellite up to the time of the avoidance manoeuvre so as to obtain an orbital position before the manoeuvre;

evaluating the effect of the manoeuvre applied to the orbit before the manoeuvre at the time of the avoidance manoeuvre so as to determine the true orbit after the avoidance manoeuvre at the time of the avoidance manoeuvre;

propagating the orbit before the manoeuvre up to the time of closest approach so as to obtain an orbital position of the true orbit without avoidance manoeuvre at the time of closest approach;

propagating the orbital position after the manoeuvre up to the time of closest approach so as to obtain an orbital position of the true orbit with avoidance manoeuvre at the time of closest approach;

determining the orbital position difference at the time of closest approach according to the effect of the manoeuvre, according to the orbital position of the true orbit without avoidance manoeuvre at the time of closest approach and according to the orbital position of the true orbit with avoidance manoeuvre at the time of closest approach.

Another object of the invention relates to a system for estimating collision between a satellite in orbit around the Earth and at least one piece of space debris, the system comprising:

means for processing information on the ground configured for:
  obtaining a reference orbit of the satellite and its covariance and an orbit of said piece of space debris and its covariance;
  determining at least one state transition matrix allowing propagation of the orbit of the satellite and its covariance at a time of closest approach;
  communicating the reference orbit of the satellite and its covariance, the orbit of said piece of space debris and its covariance, and said state transition matrix to the satellite;

calculation resources on board the satellite configured for:
  determining in real time a true orbit of the satellite by a navigation device of the satellite;
  propagating the true orbit of the satellite and its covariance, the orbit of said piece of space debris and its covariance up to the time of closest approach according to said state transition matrix and the reference orbit of the satellite;
  calculating a first probability of collision between the satellite and said piece of space debris at the time of closest approach, so as to evaluate the need to modify the orbital trajectory of the satellite, an orbital position of the satellite and respectively of the piece of space debris being obtained from the orbit of the satellite and respectively of the piece of space debris.

Another object of the invention relates to a computer program product comprising a first set of instructions which, when the program is executed by a first computer, lead the latter to implement the steps by processing means on the ground, of the method according to the invention and comprising a second set of instructions which, when the program is executed by a second computer, lead the latter to implement the steps by calculation means on board the satellite of the method according to the invention.

Another object of the invention relates to an information storage medium storing a computer program comprising a first set of instructions for implementing, by a first processor, the ground steps of the method according to the invention, when said program is read and executed by said first processor and comprising a second set of instructions for implementing, by a second processor, the steps on board the satellite of the method according to the invention, when said program is read and executed by said first processor.

A first advantage of the invention is to allow taking into account the orbit measured in real time by a navigation device of the satellite for the estimation of the risk of collision.

Another advantage is to simplify all the calculations that can thus be performed by calculation means on board the satellite.

Another advantage is that the calculation means on board the satellite can autonomously anticipate a correction of its trajectory. Several corrections can be anticipated by the calculation means on board the satellite. Corrections can also be made by the calculation means on board the satellite for one or more pieces of debris.

An advantage is also that the calculation means on board the satellite for the implementation of the invention are limited compared to the processing means on the ground, but allow increased precision in the estimation of the risk of collision and in anticipation of evasive manoeuvres.

Another advantage is that the collision risk estimates, as well as the calculations of possible avoidance manoeuvres can be ordered as close as possible to the time of closest approach. Indeed, it is not necessary, via a ground loop, to transmit the manoeuvre plan on board the satellite when it is visible by the ground station. This allows on the one hand to further improve the precision and on the other hand to avoid the implementation of unnecessary avoidance manoeuvres. Indeed, the passage via the ground loop requires calculations to be made further in advance, which increases the uncertainties and generally results in avoidance manoeuvres which were not necessarily required.

BRIEF DESCRIPTION OF THE FIGURES

Other advantages, purposes and features of the present invention emerge from the description which follows given, for the purpose of explanation and in a non-limiting manner, with reference to the appended drawings, wherein:

FIG. 11: is an example of a flowchart of the collision estimation method between the satellite in orbit around the Earth and at least one piece of space debris;

FIG. 12: is an example of a flowchart relating to the determination of the time of the avoidance manoeuvres;

FIG. 13: is a schematic representation of a device for implementing the collision estimation method between the satellite in orbit around the Earth and at least one piece of space debris $d_1$.

DESCRIPTION OF EMBODIMENTS

Figure 1:
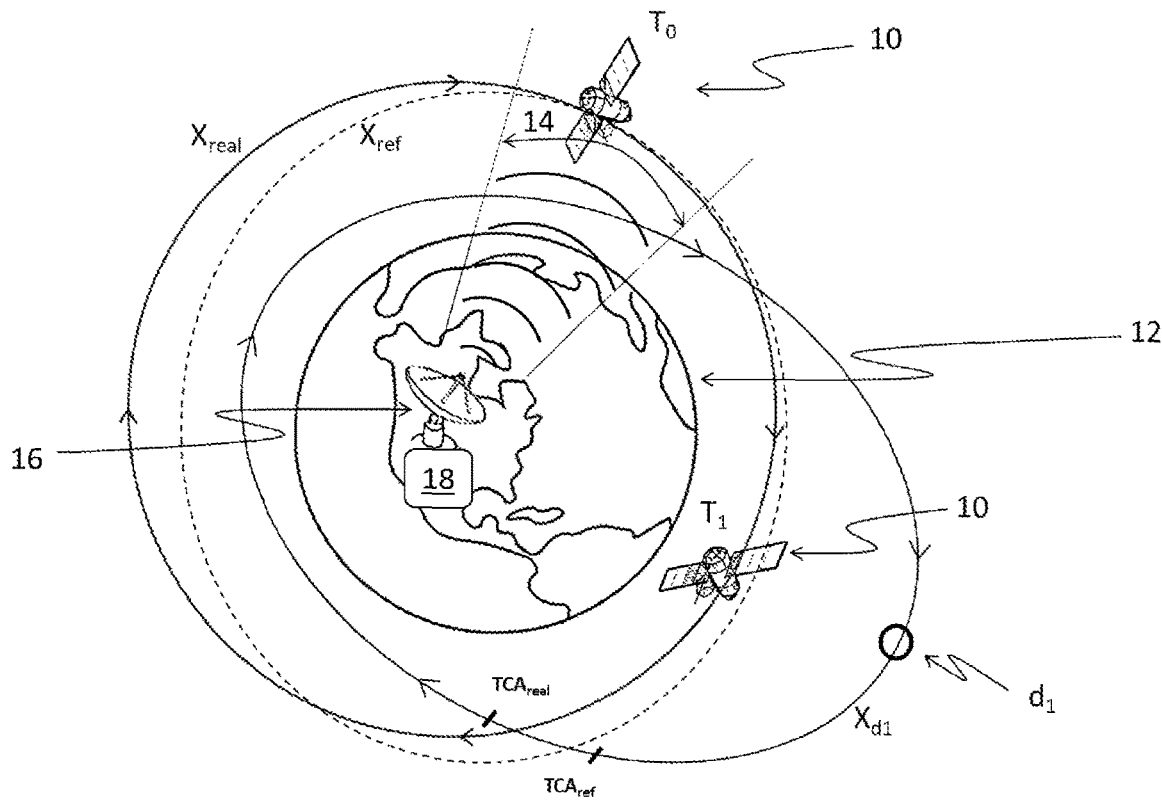
FIG. 1: is a schematic representation of a satellite in orbit around the Earth according to its reference orbit and according to its true orbit, and of a piece of space debris at risk of collision with the satellite.

According to FIG. 1, a satellite 10 in orbit around the Earth 12 and a piece of space debris $d_1$ also in orbit around the Earth 12 are represented. A satellite is capable of autonomously managing its station-keeping manoeuvres. Information relating to satellite station-keeping manoeuvres is only available on the ground during specific times during which the satellite is in the field of communication with the communication antennas on the ground allowing the radio connection between the satellite and the operators on the ground. To this end, taking into account the station-keeping manoeuvre of the satellite in the estimation of the orbit of the satellite by the operators cannot generally be carried out in real time, which does not allow to correctly estimate the risk of collision, in so far as the ground is not able to correctly predict the trajectory of the satellite. The satellite 10 can only be in communication with a satellite control centre 18 when it is in the communication field or fields of vision 14 of communication means 16 on the ground connected to the satellite control centre 18. According to FIG. 1, the satellite 10 is represented for a first instant $T_0$ in its theoretical orbit, known by the satellite control centre 18, that is to say in its orbit related to its mission or also called reference orbit $X_{ref}$ of the satellite. In a non-limiting manner, the satellite control centre 18 comprises means for processing information and communicating with the satellites. The information processing means may comprise, for example, a microcontroller or processors executing programs configured to calculate a set of data necessary for the satellites. The communication means can comprise emitting and receiving antennas to transmit all the necessary data to the satellites.

According to FIG. 1, the satellite 10 is also shown on another orbit, called true orbit $X_{real}$ of the satellite 10 at an instant $T_1$ after the instant $T_0$. Indeed, the reference orbit $X_{ref}$ of the satellite may differ from the true orbit $X_{real}$ of the satellite 10. Thus the reference orbit differs from the true orbit followed by the satellite as measured by on-board navigation means of increased precision. The satellite 10 comprises for example a navigation device allowing it to know its orbital position in real time. The difference in trajectory between the trajectory of the true orbit $X_{real}$ and the trajectory of the reference orbit $X_{ref}$ is in particular due to the manoeuvres carried out by the satellite 10 autonomously and subsequent to the first instant $T_0$, such as for example and in a non-limiting manner, station-keeping manoeuvres of the satellite 10. The difference between the trajectory of the true orbit $X_{real}$ and the trajectory of the reference orbit $X_{ref}$, relates in particular to the fact that the satellite 10 controls its manoeuvres to remain close to the trajectory of the reference orbit $X_{ref}$, without however being perfectly servo-controlled.

The piece of space debris $d_1$ has its own orbit $X_{d1}$ corresponding to its own orbital trajectory. The satellite control centre 18 on the ground collaborates in particular with agencies for monitoring the pieces of space debris such as, for example, the American organisation CSOC (Combined Space Operations Centre), or the international organisation SDA (The Space Data Association). From the data representative of the orbit of the piece of space debris $X_{d1}$ and its covariance $COV_{d1}$, as well as from the reference orbit $X_{ref}$ of the satellite 10 and its covariance $COV_{sat}$, the control centre on the ground is able to determine a reference time of closest approach $TCA_{ref}$ of the piece of space debris with the satellite 10. The reference time of closest approach $TCA_{ref}$ corresponds to the time on which the distance between the mean reference orbital position and the mean orbital position of the piece of debris is the smallest.

It should be noted, according to FIG. 1, that the reference time of closest approach $TCA_{ref}$ of the piece of space debris $d_1$ with the satellite 10 estimated on the ground, may differ from a real time of closest approach $TCA_{real}$ between the piece of space debris $d_1$ and the satellite when considering the true mean orbital trajectory of the satellite 10 corresponding to its true orbit as measured by the on-board navigation means. This real time of closest approach $TCA_{real}$ cannot be determined on the ground, since the satellite control centre 18 only knows the reference orbit $X_{ref}$ of the satellite and not the true orbit of the $X_{real}$ of the satellite.

The satellite 10 is configured to estimate a probability of collision $P_1$ between the piece of space debris d1 and the satellite 10 at a time of closest approach TCA according to its true orbit. The satellite is thus able to calculate the probability of collision at the real time of closest approach $TCA_{real}$ as it could also do so at the reference time of closest approach $TCA_{ref}$. In this respect, the satellite 10 comprises calculation means which can, for example and in a non-limiting manner, comprise a microcontroller. In order to estimate a probability of collision $P_1$ between the piece of space debris $d_1$ and the satellite 10 at a time of closest approach TCA, it is necessary to know the orbit of the satellite 10 and its covariance $COV_{sat}$ at this time of closest approach TCA, as well as the orbital position of the piece of space debris $d_1$ and its covariance $COV_{d1}$ at this time of closest approach TCA. For this purpose, it is necessary to determine, a data ephemeris allowing to propagate a state difference, also called ephemeris of state transition data or state transition matrix, allowing a propagation of the true orbit $X_{real}(t)$ of the satellite and its covariance Coy on this reference time of closest approach TCA.

More particularly, the true orbit of the satellite can be propagated using a state transition matrix φ. At least one state transition matrix φ is determined by the control centre 18 of the satellites. The state transition matrix φ allows for example a propagation, at the reference time of closest approach $TCA_{ref}$, of the true orbit $X_{real}$ of the satellite and of its covariance $Cov_{sat}$ measured at an instant $t_0$.

To this end, with the aim of making the satellite 10 autonomous in terms of its ability to more accurately estimate a probability of collision with a piece of space debris $d_1$, it is possible to calculate, by the information processing means on the ground, the state transition matrix φ and communicate this state transition matrix φ ($t_0 \rightarrow TCA_{ref}$) to the satellite 10. The satellite 10 will thus be able to determine its orbit at to then its orbit at the reference time of closest approach $TCA_{ref}$. The propagation of the difference in orbit between the true orbit $X_{real}$ of the satellite 10 and the reference orbit $X_{ref}$ of the satellite 10 is determined by the calculation means on board the satellite. It will be noted that the propagation over time of the true orbit $X_{real}$ of the satellite 10 can be calculated according to the following equation:

$$X_{real}(t) = X_{ref}(t) + \Delta X(t) \quad (1)$$

or again, considering the state transition matrix φ:

$$X_{real}(t) = X_{ref}(t) + \varphi_{(t0 \rightarrow t)} \Delta X(t_0) \quad (2)$$

Equation (2) is for example used to determine the true orbit $X_{real}$ at the reference time of closest approach $TCA_{ref}$, with a state transition matrix φ ($t_0 \rightarrow TCA_{ref}$) previously provided by the control centre on the ground. Several state transition matrices between two instants of interest, corresponding for example to considered predictable avoidance manoeuvres, can be provided to the satellite. The satellite 10 can also receive from the satellite control centre 18 information including in particular the orbit and the covariance related to the piece of space debris $d_1$, the reference time of closest approach $TCA_{ref}$ and the reference orbit $X_{ref}$ of the satellite 10 in at least two instants of interest corresponding to the instant of triggering the probability calculation and to the reference time of closest approach.

The satellite orbit corresponds to a set of six-dimensional elements. An example of an orbit will be detailed later.

In order to limit the volume of data that the calculation means of the satellite 10 will have to process, the data transmitted by the control centre 18 of the satellites allowing the on-board calculation means to calculate the probability of collision $P_1$ with the piece of space debris $d_1$ can be limited to:

at least one activation time $t_{cur}$ for calculating the collision probability $P_1$;

at least one state transition matrix φ between the activation time $t_{cur}$ and the reference time of closest approach $TCA_{ref}$;

the reference orbit of the satellite at least at the activation time $t_{cur}$ and at the reference time of closest approach $TCA_{ref}$;

the orbit of the piece of space debris $d_1$ and its covariance at least at the reference time of closest approach $TCA_{ref}$.

To this end, the reference orbit $X_{ref}$ can be determined in particular from the control centre 18 of the satellites using a complex model from the orbital parameters, also including the upper harmonics of the gravitational potential of the Earth. The state transition matrix φ can be calculated from a limited development around the reference orbit of the satellite and will be sent to the satellite together with the information relating to the orbit of the piece of space debris and its covariance. The propagation used during the calculation using the state transition matrix φ can thus take into account complex models necessary for high precision. An advantage of calculating the state transition matrix φ from the control centre 18 of the satellites is in particular to be able to take advantage of a much greater calculation power than that which can be on board the satellite 10.

The propagation of the reference orbit $X_{ref}$ of the satellite 10 can be determined, by information processing means on the ground, according to a free drift propagation of the reference orbit $X_{ref}$ of the satellite 10, that is to say without manoeuvre of the satellite 10, from the activation time $t_{cur}$ until the reference time of closest approach $TCA_{ref}$. In this respect, the information processing means on the ground determine the reference orbit $X_{ref}$ of the satellite 10 and the state transition matrix $\varphi(t_{cur} \to TCA_{ref})$ between the activation time and the reference time of closest approach.

More particularly, it involves reconstructing the reference orbit $X_{ref}$ at the activation time $t_{cur}$ and propagating this reference orbit $X_{ref}(t_{cur})$ at the reference time of closest approach $TCA_{ref}$. This allows to have:
- the reference orbit $X_{ref}(t_{cur})$ at the activation time $t_{cur}$;
- the reference orbit $X_{ref}(TCA_{ref})$ propagated at the reference time of closest approach $TCA_{ref}$;
- the state transition matrix $\varphi(t_{cur} \to TCA_{ref})$ between the activation time $t_{cur}$ and the reference time of closest approach $TCA_{ref}$.

Figure 2:
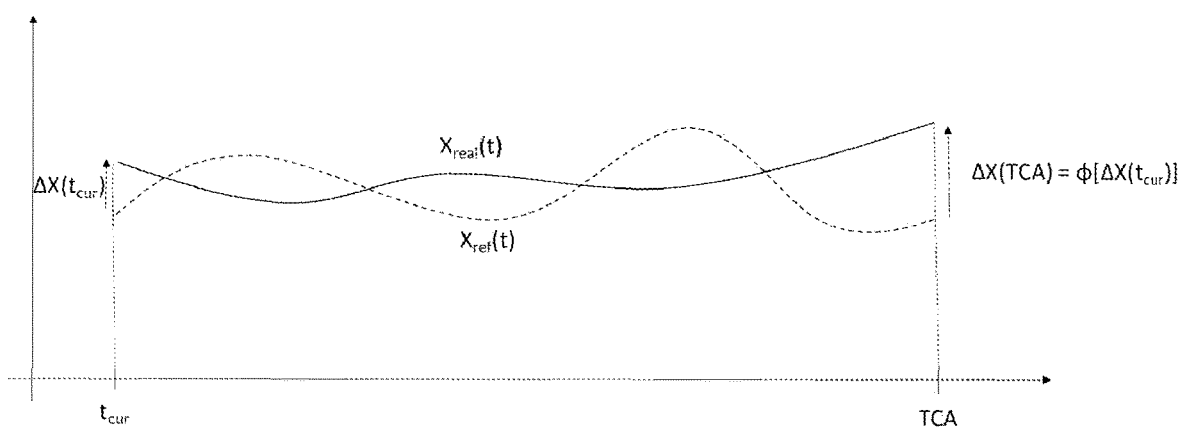
FIG. 2: is a schematic representation in the form of a temporal graph of a propagation of the true orbit of the satellite by means of a state transition matrix and its reference orbit.

According to FIG. 2, it will be noted that the propagation until to the reference time of closest approach $TCA_{ref}$ of the true orbit $X_{real}$ of the satellite 10 can be calculated by the calculation means on board the satellite 10 according to the following equation:

$$X_{real}(TCA_{ref}) = X_{ref}(TCA_{ref}) + \Delta X(TCA_{ref}) \qquad (3)$$

In this respect, the satellite 10, knowing its true orbit $X_{real}(t_{cur})$ at the activation time $t_{cur}$ thanks in particular to its navigation device, is capable of calculating the orbital difference $\Delta X(t_{cur})$ between its true orbit $X_{real}(t_{cur})$ at the activation time $t_{cur}$ and the reference orbit of the satellite $X_{ref}(t_{cur})$ at the activation time $t_{cur}$, according to the following equation:

$$\Delta X(t_{cur}) = X_{real}(t_{cur}) - X_{ref}(t_{cur}) \qquad (4)$$

Knowing the state transition matrix $\varphi(t_{cur} \to TCA_{ref})$ between the activation time and the reference time of closest approach, from the equation (4), the equation (3) can also be written:

$$X_{real}(TCA_{ref}) = X_{ref}(TCA_{ref}) + \varphi(t_{cur} \to TCA_{ref}) \times \Delta X(t_{cur}) \qquad (5)$$

The state transition matrix $\varphi(t_{cur} \to TCA_{ref})$ between the activation time and the time of closest approach is applied to the orbital difference, determined at the activation time, to deduce therefrom an orbital difference at the time of closest approach.

The calculation means on board the satellite 10 also allow to calculate the covariance $COV_{sat}(TCA_{ref})$ of the satellite 10 at the time of closest approach $TCA_{ref}$ knowing the covariance $COV_{sat}(t_{cur})$ of the orbit of the satellite 10 at the activation time $t_{cur}$, according to the following equation:

$$COV_{sat}(TCA_{ref}) = \varphi(t_{cur} \to TCA_{ref}) \times COV_{sat}(t_{cur}) \times \varphi(t_{cur} \to TCA_{ref})^t \qquad (6)$$

Figure 3:
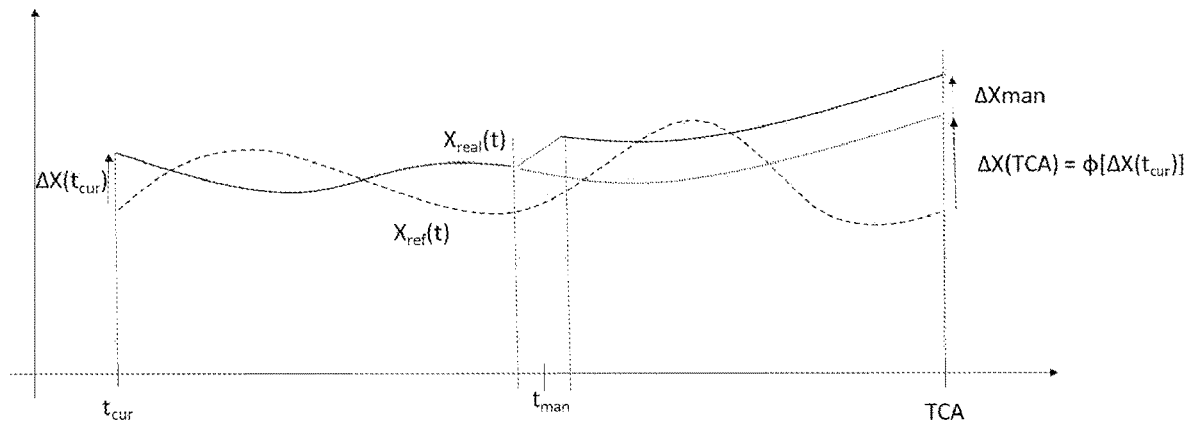
FIG. 3: is a schematic representation of the effect of a manoeuvre on the true orbit of the satellite in FIG. 2.

In the example of FIG. 3, in comparison with FIG. 2, the satellite 10 has further performed a manoeuvre after the activation time. This manoeuvre generates on the true orbit $X_{real}(TCA_{ref})$ of the satellite at the reference time of closest approach $TCA_{ref}$, an orbital difference $\Delta X_{man}$ determined by the calculation means on board the satellite 10. Taking into account a manoeuvre of the satellite 10 results in a true orbital correction $X_{real}(TCA_{ref})$ of the satellite at the reference time of closest approach $TCA_{ref}$ according to the following equation:

$$X_{real}(TCA_{ref}) = X_{ref}(TCA_{ref}) + \Delta X(TCA_{ref}) + \Delta X_{man}(TCA_{ref}) \qquad (7)$$

The orbital difference $\Delta X_{man}(TCA_{ref})$ due to the manoeuvre represents the effect of the manoeuvre at the reference time of closest approach $TCA_{ref}$. In the event that in particular the state transition matrices taking into account the manoeuvre time are not provided, the determination of the orbital difference $\Delta X_{man}(TCA_{ref})$, also called orbital correction, at the reference time of closest approach $TCA_{ref}$, can be carried out according to the following steps:
- propagating the true orbit $X_{real}$ from the activation time $t_{cur}$ until the manoeuvre time $t_{man}$ for which a secular effect J2 is added so as to obtain an orbit $X_{real\_b}(t_{man})$ before the manoeuvre;
- evaluating the effect of the manoeuvre $\Delta X_{man}(t_{man})$ according to the Gauss equation applied to the orbit $X_{real\_b}(t_{man})$ before the manoeuvre, so that $$\Delta X(t_{man}) = G(X_{real\_b}(t_{man})) \overrightarrow{\Delta V}$$

where G is a matrix relating to the thrust of the manoeuvre, determined from Gauss equations where $\overrightarrow{\Delta V}$ represents the speed variation of the manoeuvre in the local orbital frame of the satellite TNW (T vector according to the current speed $\overrightarrow{V}$, W vector according to the normal to the orbit that is to say to the vector product $\overrightarrow{P} \times \overrightarrow{V}$ where $\overrightarrow{P}$ is the position of the satellite, and where N completes the orthogonal coordinate system;
- evaluating the true orbit $X_{real\_a}(t_{man})$ after manoeuvre according to the following equation:

$$X_{real\_a}(t_{man}) = X_{real\_b}(t_{man}) + \Delta X_{man}(t_{man}) \qquad (8)$$

- propagating the effect of the manoeuvre $\Delta X_{man}(t_{man})$ on the argument of the latitude of the satellite 10 and the right ascension of the ascending node of the orbital plane of the satellite 10. To this end, two propagations with a secular effect 'J2' are determined, that is to say a first propagation of the true orbit after a manoeuvre $X_{real\_a}$ from the manoeuvre time $t_{man}$ until the reference time of closest approach $TCA_{ref}$, and a second propagation of the true orbit before a manoeuvre $X_{real\_b}$ from the manoeuvre time $t_{man}$ until the reference time of closest approach $TCA_{ref}$. To this end, two orbits are obtained. A first orbit $X_{real\_a}(TCA_{ref})$ of the satellite 10 taking into account the effect of the manoeuvre and a second orbital position $X_{real\_b}(TCA_{ref})$ of the satellite 10 not taking into account the effect of the manoeuvre;
- determining the orbital position difference $\Delta X_{man}(TCA_{ref})$ according to the following equation:

$$\Delta X_{man}(TCA_{ref}) = \Delta X_{man}(t_{man}) + X_{real\_a}(TCA_{ref}) - X_{real\_b}(TCA_{ref}) \qquad (9)$$

The advantage of formulating the orbital position difference $\Delta X_{man}(TCA_{ref})$ according to equation (9) is that the effects of the manoeuvre are separated with the time-integrated effects on the true orbit at the reference time of closest approach $TCA_{ref}$ with manoeuvre $X_{real\_a}(TCA_{ref})$ and without manoeuvre $X_{real\_b}(TCA_{ref})$. The direct effect of a manoeuvre concerns the parameters of the orbit of the satellite 10, namely: the semi-major axis 'a', the eccentricity vector $[e_x, e_y]$, the inclination 'I', and sometimes the right ascension '$\Omega$' of the ascending node of the orbital plane of the satellite 10. The time-integrated effect only concerns the right ascension '$\Omega$' of the ascending node of the orbital plane of the satellite 10 and the latitude argument '$\alpha$' of the satellite 10. This means that the secular effect 'J2' can only be considered for the propagation of these two parameters. The propagation with the secular effect 'J2' can be described according to the following formulations:

According to an initial time $t_0$ and a final time $t_1$ of propagation, that is to say from an initial orbital position $X(t_0) = [a_0, e_{x0}, e_{y0}, i_0, \Omega_0, \alpha_0]$, the final orbital position $X(t_1) = [a_1, e_{x1}, e_{y1}, i_1, \Omega_1, \alpha_1]$ is evaluated according to the following equations:

$$a_1 = a_0 \tag{10}$$

$$e_{x1} = e_{x0} \tag{11}$$

$$e_{y1} = e_{y0} \tag{12}$$

$$i_1 = i_2 \tag{13}$$

$$\Omega_1 = \Omega_0 + \frac{d\Omega}{dt}(X(t_0)) \cdot (t_1 - t_0) \tag{14}$$

$$\alpha_1 = \alpha_0 + \frac{d\alpha}{dt}(X(t_0)) \cdot (t_1 - t_0) \tag{15}$$

for which, $$\frac{d\Omega}{dt}(X(t_0)) \text{ and } \frac{d\alpha}{dt}(X(t_0))$$

are the angular rates corresponding respectively to the right ascension 'Ω' of the ascending node of the orbital plane of the satellite 10 and the argument of the latitude 'α' of the satellite 10, including the secular effect It is also advantageous to calculate the probability of collision $P_1$ of the satellite 10 according to its true orbit $X_{real}$ with the piece of space debris $d_1$, at a real time of closest approach $TCA_{real}$. To this end, in order to optimise the calculation of the probability $P_1$ of collision, the calculation means of the satellite 10 are configured to determine the real time of closest approach $TCA_{real}$ taking into account the true orbit $X_{real}$ of the satellite 10.

Figure 4:
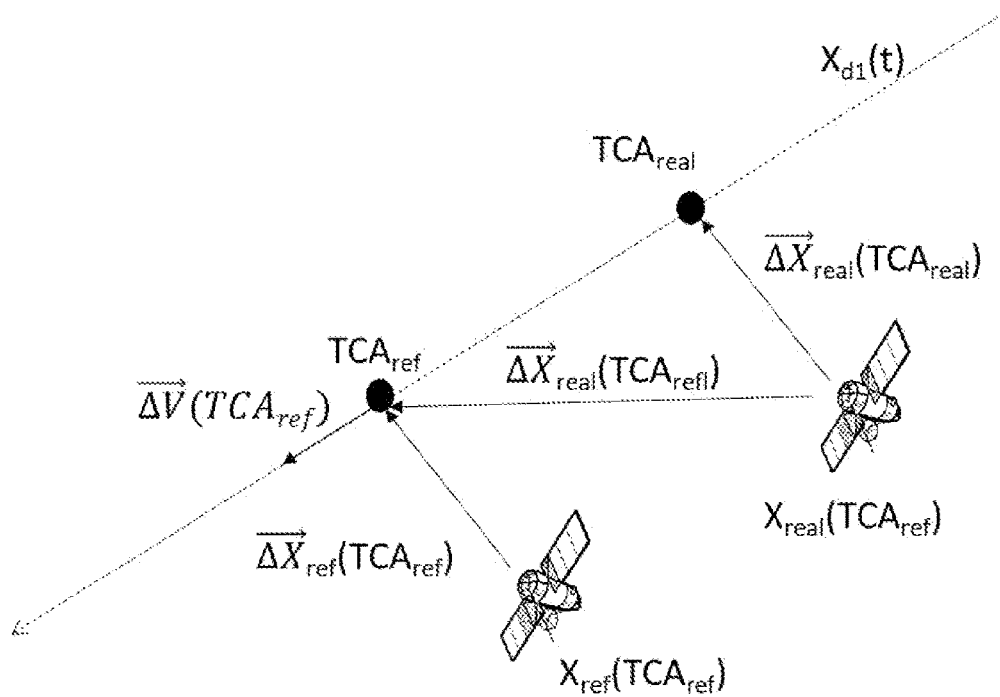
FIG. 4: is a schematic representation of a time of closest approach determined according to the reference orbit and of the time of closest approach relative to the true orbit of the satellite.

To this end, according to FIG. 4, a linear approximation of the orbital trajectory $X_{d1}(t)$ of the piece of space debris $d_1$ in the orbital plane of the satellite is represented. The reference time of closest approach $TCA_{ref}$ may differ from the real time of closest approach $TCA_{real}$. At the real time of closest approach $TCA_{real}$, the scalar product of the vector $\overrightarrow{\Delta X}_{real}$ representative of the orbital position difference between the true orbital position of the satellite 10 and the orbital position of the piece of space debris $d_1$, with the difference of orbital speed $\overrightarrow{\Delta V}$ between the satellite 10 and the piece of space debris $d_1$ must be zero or almost zero. In other words, the following equation must be satisfied:

$$\overrightarrow{\Delta X}_{real} \cdot \underline{\Delta V} \approx 0 \tag{16}$$

according to which $\underline{\Delta X}_{real}$ represents the orbital position difference between the satellite 10 and the piece of space debris $d_1$ at the real time of closest approach $TCA_{real}$, e represents the orbital position difference between the satellite 10 and the piece of space debris $d_1$ at the real time of closest approach $TCA_{real}$, and $\underline{\Delta V}$ represents the difference in orbital speed between the satellite 10 and the piece of space debris $d_1$ at the real time of closest approach $TCA_{real}$.

In order to determine the real time of closest approach $TCA_{real}$ satisfying the equation (16), the calculation means of the satellite 10 are configured to determine the time shift $\Delta TCA$ between two real times of closest approach $TCA_{real}$ calculated successively. The first time shift $\Delta TCA$ corresponds to the difference between the reference time of closest approach $TCA_{ref}$ and the first estimate of $TCA_{real}$. An iteration is then carried out by calculating a new real time of closest approach, until obtaining a time shift $\Delta TCA$ less than a predetermined threshold, such as for example less than one microsecond. The iteration is carried out by replacing each time the value of the time of closest approach $TCA_{real\_N-1}$ by a new time of closest approach $TCA_{real\_N}$ such that:

$TCA_{real\_N} = TCA_{real\_N-1} + \Delta TCA_N$ until the time shift $\Delta TCA$ is less than one microsecond.

The time shift $\Delta TCA$ can be calculated according to the following equation:

$$\Delta TCA\_N = -\frac{\overrightarrow{\Delta X} \text{ real } (TCAreal\_N-1) \cdot \overrightarrow{\Delta V} (TCAreal\_N-1)}{(\Delta V (TCAreal\_N-1))^2} \tag{17}$$

according to which $\underline{\Delta X}_{real}(TCA_{real\_N-1})$ represents the difference between the true orbital position of the satellite 10 and the orbital position of the piece of space debris $d_1$ at the time of closest approach, according to the iteration considered at the time of closest approach, and $KV(TCA_{real\_N-1})$ represents the difference in orbital speed between the speed of the satellite 10 and the speed of the piece of space debris $d_1$ at the time of closest approach, according to the iteration considered at the time of closest approach. When the iteration is finished, we have the real time of closest approach $TCA_{real}$ which corresponds to the new time of closest approach having allowed to determine a time shift $\Delta TCA$ less than a predetermined threshold, for example of one microsecond.

The satellite 10 can advantageously determine its true orbit and the orbit of the piece of debris $d_1$, as well as their covariance associated with the reference time of closest approach $TCA_{ref}$ or with the real time of closest approach $TCA_{real}$. For this purpose, the calculation means of the satellite 10 have allowed to determine, as described previously, in particular according to a state transition matrix φ, the orbits and the associated covariances of the pieces of space debris $d_1$ and of the satellite 10 at the reference time of closest approach $TCA_{ref}$. The calculation means of the satellite 10 also allow to calculate the true orbit $X_{real}$ of the satellite 10 and the orbit $X_{d1}$ of the piece of space debris $d_1$ at the real time of closest approach $TCA_{real}$, by simplified propagation, that is to say only Keplerian. The calculation means of the satellite 10 allow to propagate the true orbit $X_{real}$ of the satellite 10 and the orbit of the piece of space debris $d_1$ from the reference time of closest approach $TCA_{ref}$ until the real time of closest approach $TCA_{real}$. The calculation means of the satellite 10 are configured to calculate the probability of collision $P_1$ between the satellite 10 on its true orbital trajectory $X_{real}$ and the piece of space debris $d_1$.

Figure 5:
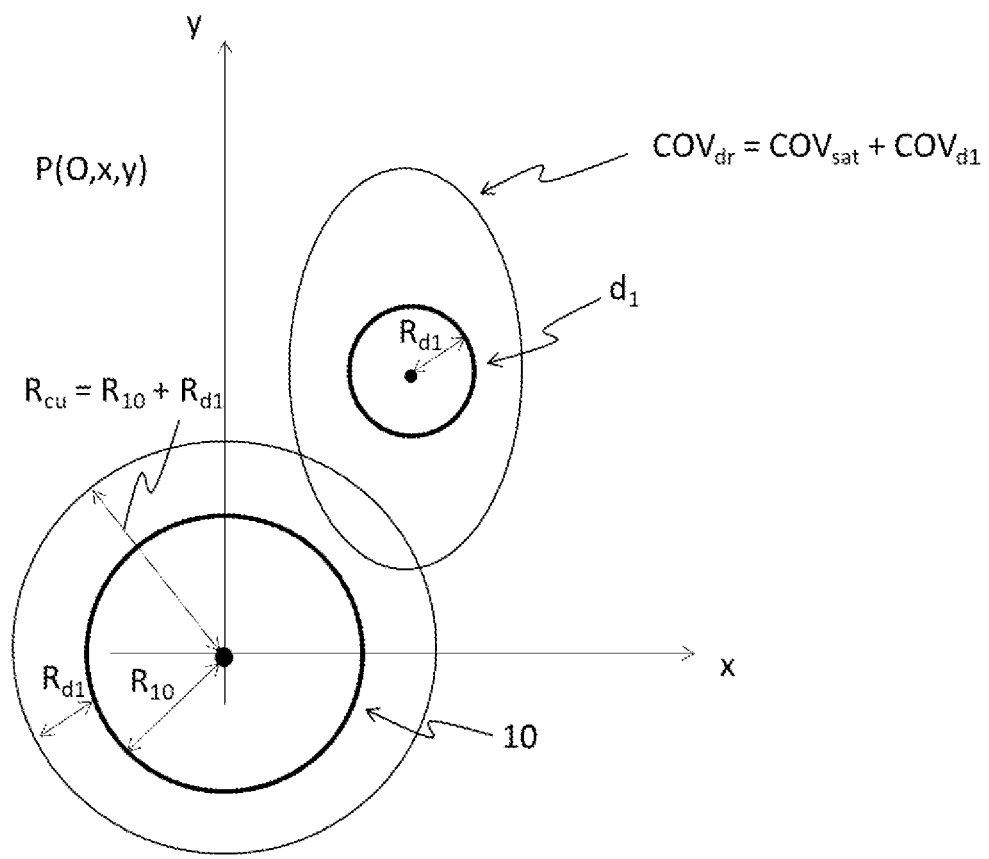
FIG. 5: is a schematic representation of the piece of space debris and the satellite, in a situation of imminent risk of collision, projected into the collision plane.

According to FIG. 5, the piece of space debris $d_1$ and the satellite 10 according to their relative orbital position $\underline{\Delta X}_{real}(TCA\_real)$ at the considered time of closest approach $TCA\_real$, as well as their covariance $COV_{sat}$, $COV_{d1}$ are represented and projected in a plane $P(O,x,y)$, this plane $P(O,x,y)$ being taken orthogonal to the relative speed $\Delta V$ between the satellite 10 and the piece of space debris $d_1$. The satellite 10 and the piece of space debris $d_1$ are respectively modelled according to a circle of radius Rio for the satellite and of radius Rdi for the piece of space debris $d_1$. The relative distance between the satellite 10 and the piece of space debris $d_1$ is projected into the orbital plane of the satellite 10, along with its associated covariance $COV_{dr}$. The covariance $COV_{dr}$ of the relative distance is expressed by the sum of the covariance of the satellite 10 and the piece of space debris $d_1$.

The projected covariance $COV_{pdr}$ of the relative distance can be expressed in any basis B according to the diagonal matrix:

$$COVpdr = \begin{pmatrix} \sigma_x & 0 \\ 0 & \sigma_y \end{pmatrix} \tag{18}$$

According to which $\sigma_x$ and $\sigma_y$ represent the positron dispersions. A set Cr(x,y) is defined as a set of points x, y in the circle of cumulative radius $R_{cu}$ representative of the sum of the radius Rio of the modelled satellite 10 and of the radius Rai of the modelled piece of space debris $d_1$. For this purpose, the set Cr(x,y) of points x,y meets the criterion according to which:

$$x^2 + y^2 < R^2_{cu} \quad (19)$$

The collision probability $P_1$ corresponds to the probability for which the difference in distance between the satellite 10 and the piece of space debris $d_1$ may be less than the cumulative radius $R_{cu}$. The probability of collision $P_1$ can therefore be calculated by integrating the probability density function of the difference in distance on the circle of cumulated radius $R_{cu}$. With density laws taken with a normal distribution, with average values z and y corresponding to the coordinates of the relative distance projected in the plane of the orbit of the satellite 10, and dispersions dx and as, the probability $P_1$ of collision can be written in the following numerical form:

$$P_1 = \int\int_{(x,y)\in Cr} \frac{1}{\sigma_x \cdot \sigma_y \cdot 2\pi} * e^{\frac{(x-\bar{x})^2}{2 \cdot \sigma_x^2}} * e^{\frac{(y-\bar{y})^2}{2 \cdot \sigma_y^2}} * dx. \, dy \quad (20)$$

It is advantageous to minimise the calculation power of the calculation means on board the satellite as much as possible. To this end, it is preferable for the calculation means on board the satellite to evaluate the probability of collision $P_1$ according to a semi-analytical, or even preferably analytical, expression.

It will be noted in particular that the probability of collision $P_1$ between the satellite 10 and the piece of space debris $d_1$ can be evaluated according to the following semi-analytical equation:

$$P_1 = \int \frac{1}{2\sqrt{2\pi}\sigma_x} e^{-\frac{1}{2}\left(\frac{x-\bar{x}}{\sigma_x}\right)^2} \left( \text{erf}\left(\frac{\bar{y}+\sqrt{r^2-x^2}}{\sqrt{2}\sigma_y}\right) - \text{erf}\left(\frac{\bar{y}-\sqrt{r^2-x^2}}{\sqrt{2}\sigma_y}\right) \right) dx \quad (21)$$

This expression allows faster evaluation than the numerical formulation because it requires a single integration and the evaluation of an error function erf.

It will also be noted, preferably, that the probability of collision $P_1$ between the satellite 10 and the piece of space debris $d_1$ can also be evaluated according to the analytical equation in the form of a convergent series with positive terms, according to the following formulation:

$$P_1 = e^{\left(\frac{R^2}{2\sigma_x^2}\right)} \sum_{k=0}^{\infty} \frac{\alpha_k}{(k+1)!} R^{2(k+1)} \quad (22)$$

The analytical formulation allows the best speed of calculation of the probability of collision $P_1$ between the satellite 10 and the piece of space debris $d_1$.

It should be noted that the determination of the true orbit $X_{real}$ of the satellite 10 and of the orbit $X_{d1}$ of the piece of space debris $d_1$ induces an uncertainty on the estimated covariances $COV_{sat}$, $COV_{d1}$ related to the determined orbits. Preferably, in order to take into account such an uncertainty in the calculation of the probability of collision $P_1$ between the satellite 10 and the piece of space debris $d_1$, it is possible to maximise the probability of collision $P_1$ by shifting both the covariance $COV_{sat}$ of the true orbit $X_{real}$ of the satellite and the covariance $COV_{d1}$ of the orbit $X_{d1}$ of the piece of space debris $d_1$. The technique used to shift both the covariance $COV_{sat}$ of the true orbit $X_{real}$ of the satellite and the covariance $COV_{d1}$ of the orbit $X_{d1}$ of the piece of space debris $d_1$ is a technique called covariance dilution technique. For this purpose, preferably, a coefficient $K_{sat}$ linked to the covariance $COV_{sat}$ of the satellite 10 and a coefficient Kai linked to the covariance $COV_{d1}$ of the piece of space debris $d_1$ are added relative to the calculation of the probability $P_1$ of collision. The determination of the coefficients linked to the covariances comprises the determination of the pair (Ks, Kd) of coefficients which maximise the probability $P_1$ of collision, in particular requiring knowledge of the cumulative covariance $COV_{dr}$ determined according to the following equation:

$$COV_{dr} = Ks \times COV_{sat} + Kd \times COV_{d1} \quad (23)$$

Such an optimum can, for example and in a non-limiting manner, be determined according to a gradient method referred to as the golden ratio method. For example and in a non-limiting manner, the pair (Ks, Kd) of coefficients where each coefficient is comprised in an interval ranging from 0.2 to 5.

The method for estimating the collision between the piece of space debris $d_1$ and the satellite 10 in orbit around the Earth 12 comprises estimating the probability of collision $P_1$ for which the collision could occur at the considered time of closest approach TCA, that is to say either the reference time of closest approach $TCA_{ref}$ or the real time of closest approach $TCA_{real}$.

Figure 6:
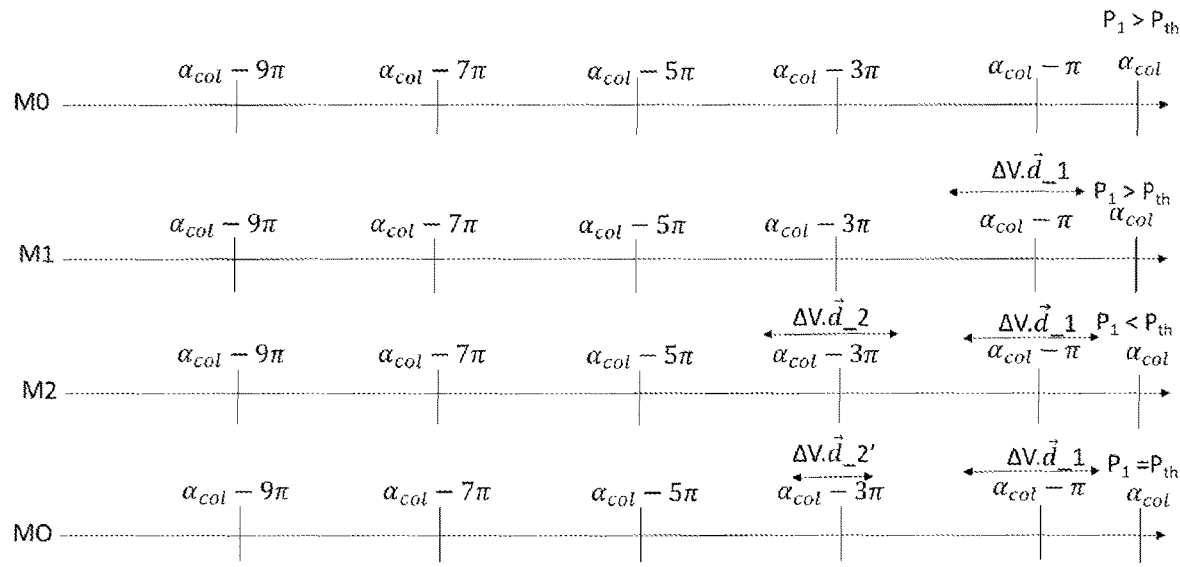
FIG. 6: is a temporal schematic representation of a collision probability calculation step according to several avoidance manoeuvres according to a first embodiment.

As represented according to the example of FIG. 6, the collision estimation method can comprise the determination of one or more avoidance manoeuvres $\Delta V \cdot \vec{d}$ allowing to reduce the probability of collision $P_1$ of the satellite 10 with the piece of debris $d_1$ at the considered time of closest approach TCA, that is to say at an orbital position corresponding to an argument of the latitude $\alpha_{col}$ at the considered time of the closest approach TCA, also called argument of the latitude $\alpha_{col}$ of collision. Optimally, each avoidance manoeuvre $\Delta V \cdot \vec{d}$ can take place according to an argument of the latitude $\alpha_{man}$ of manoeuvre opposed to the argument of the latitude $\alpha_{col}$ of collision with the piece of space debris $d_1$, that is to say located at least according to an argument of the latitude of manoeuvre equal to $\alpha_{man} = \alpha_{col} - (2n-1) \cdot \pi$ for which, preferably 'n' is an integer greater than zero.

According to FIG. 6, a preliminary step M0 of the collision estimation method comprises the determination of the argument of the latitude $\alpha_{col}$ of the satellite 10 for which the collision may be probable, that is to say the argument of the latitude $\alpha_{col}$ of collision. To this end, from the considered time of closest approach TCA, the calculation means on board the satellite 10 can determine the argument of the latitude $\alpha_{col}$ of collision. The probability of collision $P_1$ according to the true orbit $X_{real}$ of the satellite at the considered time of closest approach TCA is greater than a predefined threshold of probability $P_{th}$ of collision, this said predefined threshold of probability $P_{th}$ of collision being able to be for example and in a non-limiting manner, a threshold called critical threshold, above which it is considered that the risk of collision is too high to maintain the orbit of the satellite as such.

For this purpose, according to a first step M1, preferably, a first avoidance manoeuvre $\Delta V \cdot \vec{d}\_1$ must be determined by the calculation means on board the satellite 10. For this purpose, the calculation means are configured to estimate the first avoidance manoeuvre $\Delta V \cdot \vec{d}\_1$ allowing the radial separation between the satellite 10 and the piece of space debris $d_1$ at the considered time of closest approach TCA. This first avoidance manoeuvre $\Delta V \cdot \vec{d}\_1$ must preferably be executed for an orbital position of the satellite 10 opposite to that which the satellite 10 will have at the considered time of closest approach TCA in order to maximise the radial separation between the satellite 10 and the piece of space debris at the considered time of closest approach TCA.

This first avoidance manoeuvre $\Delta V \cdot \vec{d}\_1$ must also be sufficiently distant in time so that it can be executed before the probable collision. The orbital position of the satellite 10 for which the execution of the first avoidance manoeuvre $\Delta V \cdot \vec{d}\_1$ could be effective, could be chosen, for example and in a non-limiting manner, at an orbital position of the satellite 10 corresponding to an argument of the latitude $\alpha_{man1}$ of a first avoidance manoeuvre $\Delta V \cdot \vec{d}\_1$ according to the following equation:

$$\alpha_{man1} = \alpha_{col} - \pi \quad (24)$$

Following this first avoidance manoeuvre $\Delta V \cdot \vec{d}\_1$ the calculation means on board the satellite 10 are configured to estimate a new trajectory of the true orbit $X_{real}$ of the satellite 10 as explained according to FIG. 3 and according to the equations (7) and (9) of the present invention. To this end, the calculation means on board the satellite 10 are configured to re-estimate the probability of collision $P_1$ after the first avoidance manoeuvre $\Delta V \cdot \vec{d}\_1$. According to the example shown in FIG. 6, the probability of collision $P_1$ following the first determined manoeuvre $\Delta V \cdot \vec{d}\_1$ is greater than the predefined threshold of probability $P_{th}$ of collision.

To this end, according to a second step M2, preferably, a second avoidance manoeuvre $\Delta V \cdot \vec{d}\_2$ is determined by the calculation means on board the satellite 10. In order to maximise the radial separation between the satellite 10 and the piece of space debris $d_1$ at the considered time of closest approach TCA, the second avoidance manoeuvre $\Delta V \cdot \vec{d}\_2$ must preferably be executed according to an orbital position of the satellite 10 during an orbit before the first avoidance manoeuvre $\Delta V \cdot \vec{d}\_1$. More specifically, the orbital position of the satellite 10 for which the execution of the second avoidance manoeuvre $\Delta V \cdot \vec{d}\_2$ could be effective, could be chosen, for example and in a non-limiting manner, at an orbital position of the satellite 10 corresponding to an argument of the latitude $\alpha_{man2}$ of a first avoidance manoeuvre $\Delta V \cdot \vec{d}\_2$ according to the following equation:

$$\alpha_{man2} = \alpha_{col} - 3\pi \quad (25)$$

Following this second avoidance manoeuvre $\Delta V \cdot \vec{d}\_2$ the calculation means on board the satellite 10 are configured to estimate a new orbital trajectory of the satellite 10 as explained according to FIG. 3 and according to the equations (7) and (9) of the present invention. To this end, the calculation means on board the satellite 10 are configured to re-estimate the probability of collision $P_1$ after the second avoidance manoeuvre $\Delta V \cdot \vec{d}\_2$. According to the non-limiting example of FIG. 6, the probability of collision $P_1$ following the second determined avoidance manoeuvre $\Delta V \cdot \vec{d}\_2$ is lower than the predefined threshold of probability $P_{th}$ of collision.

In general, depending on the value of the probability of collision $P_1$ after the second avoidance manoeuvre $\Delta V \cdot \vec{d}\_2$ the calculation means on board the satellite 10 can either evaluate other avoidance manoeuvres in addition to the first avoidance manoeuvre $\Delta V \cdot \vec{d}\_1$ and the second avoidance manoeuvre $\Delta V \cdot \vec{d}\_2$ according to the same principle as that explained for the first avoidance manoeuvre $\Delta V \cdot \vec{d}\_1$ and for the second avoidance manoeuvre $\Delta V \cdot \vec{d}\_2$ or consider that the accumulation of the first avoidance manoeuvre $\Delta V \cdot \vec{d}\_1$ and the second avoidance manoeuvre $\Delta V \cdot \vec{d}\_2$ is sufficient to limit the risk of collision between the satellite 10 and the piece of space debris $d_1$.

According to the invention, an avoidance manoeuvre $\Delta V \cdot \vec{d}$ can comprise a maximum variation $\Delta V_{max}$ of speed which can be linked, for example and in a non-limiting manner, to the maximum energy consumption available from the propulsion device of the satellite 10 authorised for an avoidance manoeuvre $\Delta V \cdot \vec{d}$. A minimum variation $\Delta V_{min}$ of the speed of the satellite 10 is for example defined. This minimum variation is linked to the minimum thrust energy necessary for the satellite 10 to perform a change of orbit of the satellite 10.

As represented in FIG. 6, when the probability of collision $P_1$ following the second determined avoidance manoeuvre $\Delta V \cdot \vec{d}\_2$ is lower than the predefined threshold of probability $P_{th}$ of collision, it is possible to add an optimisation step M0 comprising the optimisation of the second avoidance manoeuvre $\Delta V \cdot \vec{d}\_2$, so as, for example and in a non-limiting manner, to limit the energy necessary for this second avoidance manoeuvre $\Delta V \cdot \vec{d}\_2$ allowing to obtain for example a collision probability $P_1$ equal or even closest to the predefined threshold of probability $P_{th}$ of collision. In this respect, the collision probability $P_1$ can be recalculated according to a new speed difference $\Delta V\_2'$ of the second avoidance manoeuvre $\Delta V \cdot \vec{d}\_2'$ reduced in relation to the initial speed difference, the initial speed difference $\Delta V\_2$ being able to be a maximum speed difference. The direction $\vec{d}\_2$ of the second avoidance manoeuvre $\Delta V \cdot \vec{d}\_2$ will be adjusted according to either a direction $\vec{d}\_2$ of the second avoidance manoeuvre $\Delta V \cdot \vec{d}\_2$ in the direction of the speed of the satellite 10, or in a direction $\vec{d}\_2$ in the opposite direction to the speed of the satellite 10 with the aim of maximising the radial separation at the considered time of closest approach TCA.

Figure 7:
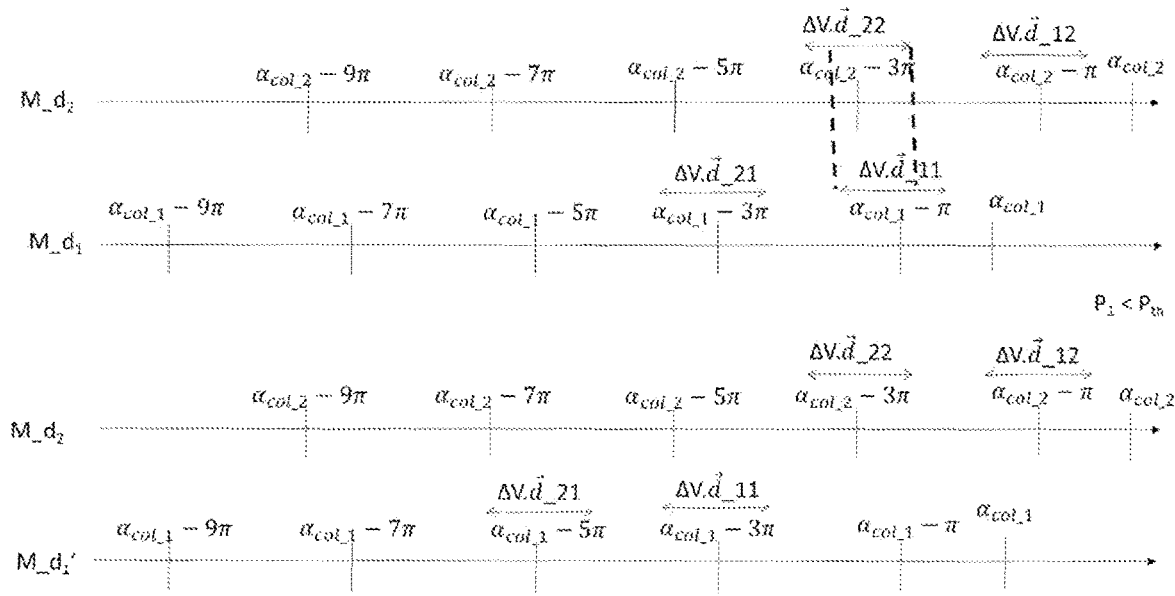
FIG. 7: is a temporal schematic representation similar to FIG. 6 according to two pieces of space debris at risk of collision with the satellite

According to the example of FIG. 7, the collision estimation method can relate to a plurality of pieces of space debris. To this end, similarly to FIG. 6, a step $M\_d_1$ relating to the determination of the probability of collision $P_1$ with the first piece of space debris $d_1$ is represented. This step $M\_d_1$ relating to the calculation of the probability of collision $P_1$ was carried out with a first avoidance manoeuvre $\Delta V \cdot \vec{d}\_11$ and a second avoidance manoeuvre $\Delta V \cdot \vec{d}\_21$ respectively provided to be carried out when the satellite 10 is in the orbital position corresponding to an argument of the latitude $\alpha_{man11}$ of first avoidance manoeuvre $\Delta V \cdot \vec{d}\_11$ equal to the argument of the latitude of collision with the first piece of space debris $d_1$ minus a half orbit $\alpha_{man11} \times \alpha_{col1} - \pi$, and in orbital position corresponding to an argument of the latitude $\alpha_{man21}$ of the second avoidance manoeuvre $\Delta V \cdot \vec{d}\_21$ equal to the argument of the latitude of collision with the first piece of space debris $d_1$ minus one and a half orbits $\alpha_{man21} = \alpha_{col1} - 3\pi$.

In the event that the first avoidance manoeuvre $\Delta V \cdot \vec{d}\_11$ and the second avoidance manoeuvre $\Delta V \cdot \vec{d}\_21$ generate a risk of collision with a second piece of space debris $d_2$, this must be avoided. According to the same principle as that exposed in FIG. 6, a step $M\_d_2$ representative of the estimation of the probability of collision $P_2$ with the second piece of space debris $d_2$ is represented according to the example of FIG. 7. This step $M\_d_2$ relating to the calculation of the probability $P_2$ with the second piece of space debris $d_2$ was carried out with a first avoidance manoeuvre $\Delta V \cdot \vec{d}\_12$ and a second avoidance manoeuvre $\Delta V \cdot \vec{d}\_22$ respectively provided to be carried out when the satellite 10 will be in orbital position corresponding to an argument of the latitude $\alpha_{man12}$ of the first avoidance manoeuvre $\Delta V \cdot \vec{d}\_12$ equal to the argument of the latitude of collision with the second piece of space debris $d_2$ minus a half orbit $\alpha_{man2} = \alpha_{col2} - \pi$, and in orbital position corresponding to an argument of the latitude $\alpha_{man22}$ of the second avoidance manoeuvre $\Delta V \cdot \vec{d}\_22$ equal to the argument of the latitude of collision with the second piece of space debris $d_2$ minus one and a half orbit $\alpha_{man22} = \alpha_{col2} - 3\pi$.

According to FIG. 7, it should be noted that according to the initial step $M\_d_1$ relating to the estimation of the probability of collision $P_1$ with the first piece of space debris $d_1$ and that according to the step $M\_d_2$ relating to the estimation of the probability of collision $P_2$ with the second piece of space debris $d_2$, the first avoidance manoeuvre $\Delta V \cdot \vec{d}\_11$ linked to the first piece of space debris $d_1$ is in time conflict with the second avoidance manoeuvre $\Delta V \cdot \vec{d}\_22$ linked to the second piece of space debris $d_2$. Indeed, the argument of the latitude $\alpha_{man11} = \alpha_{col1} - \pi$ linked to the first manoeuvre $\Delta V \cdot \vec{d}\_11$ of avoiding the first piece of space debris $d_1$ is too close to the argument of the latitude $\alpha_{col2} - 3\pi$ linked to the second avoidance manoeuvre $\Delta V \cdot \vec{d}\_22$ linked to the second piece of space debris $d_2$. The duration of one manoeuvre encroaches on the duration of the other manoeuvre so that performing these two manoeuvres is not possible according to this configuration. More particularly, the second avoidance manoeuvre $\Delta V \cdot \vec{d}\_22$ linked to the second piece of space debris $d_2$ comprises an encroachment zone with the first avoidance manoeuvre $\Delta V \cdot \vec{d}\_11$ of the first piece of space debris $d_1$ so that this encroachment zone corresponds to a zone where the first avoidance manoeuvre $\Delta V \cdot \vec{d}\_11$ of the first piece of space debris $d_1$ cannot be carried out due to the presence of the second avoidance manoeuvre $\Delta V \cdot \vec{d}\_22$ linked to the second piece of space debris $d_2$.

To this end, one solution consists in shifting the avoidance manoeuvres $\Delta V \cdot \vec{d}$ associated with a piece of debris by as much orbit as necessary until there is no longer any overlap between the avoidance manoeuvres $\Delta V \cdot \vec{d}$ provided for the avoidance of the first piece of space debris $d_1$ with the manoeuvres $\Delta V \cdot \vec{d}$ of avoiding the second piece of space debris $d_2$. According to the example of FIG. 7, the first manoeuvre $\Delta V \cdot \vec{d}\_11$ of avoiding the first piece of debris $d_1$ and the second manoeuvre $\Delta V \cdot \vec{d}\_21$ of avoiding the first piece of debris $d_1$ have both been shifted from a previous orbit to their initially determined orbital position. More specifically, the argument of the latitude $\alpha_{man11}$ of the first avoidance manoeuvre $\Delta V \cdot \vec{d}\_11$ with the first piece of space debris $d_1$ has been shifted to a new argument of the latitude $\alpha_{man11'}$ equal to the argument of the latitude of collision with the first piece of space debris $d_1$ minus one and a half orbit $\alpha_{man11'} = \alpha_{col1} - 3\pi$, the argument of the latitude $\alpha_{man21}$ of the second manoeuvre $\Delta V \cdot \vec{d}\_21$ of avoiding the first piece of space debris $d_2$ has been shifted to a new latitude argument $\alpha_{man21'}$ equal to the argument of the latitude of collision with the first piece of space debris $d_1$ minus two and a half orbits $\alpha_{man11'} = \alpha_{col1} - 5\pi$, According to FIG. 8, an example of a period of revolution of the satellite 10 around the earth, also called orbital period of the satellite 10 around the Earth 12, is represented schematically by a discontinuous circle formed by several arcs of a circle. Each arc of a circle represents a time slot that can be dedicated to an operation of the satellite 10. By way of non-limiting example, and according to FIG. 6, the orbital period of the satellite 10 can comprise nine time slots provided for various predetermined operations of the satellite 10 such as operations of charging a power supply battery of the satellite 10, corrections if necessary of the attitude of the satellite 10, photographs of the Earth 12 and or any other operations of the satellite 10. By way of non-limiting example, and according to FIG. 8, the orbital period of the satellite 10 can comprise six time slots not dedicated to predetermined operations which will be referred to in the remainder of the description as free manoeuvre slots $Sl_1$, $Sl_2$, $Sl_3$, $Sl_4$, $Sl_5$, $Sl_6$.

Figure 8:
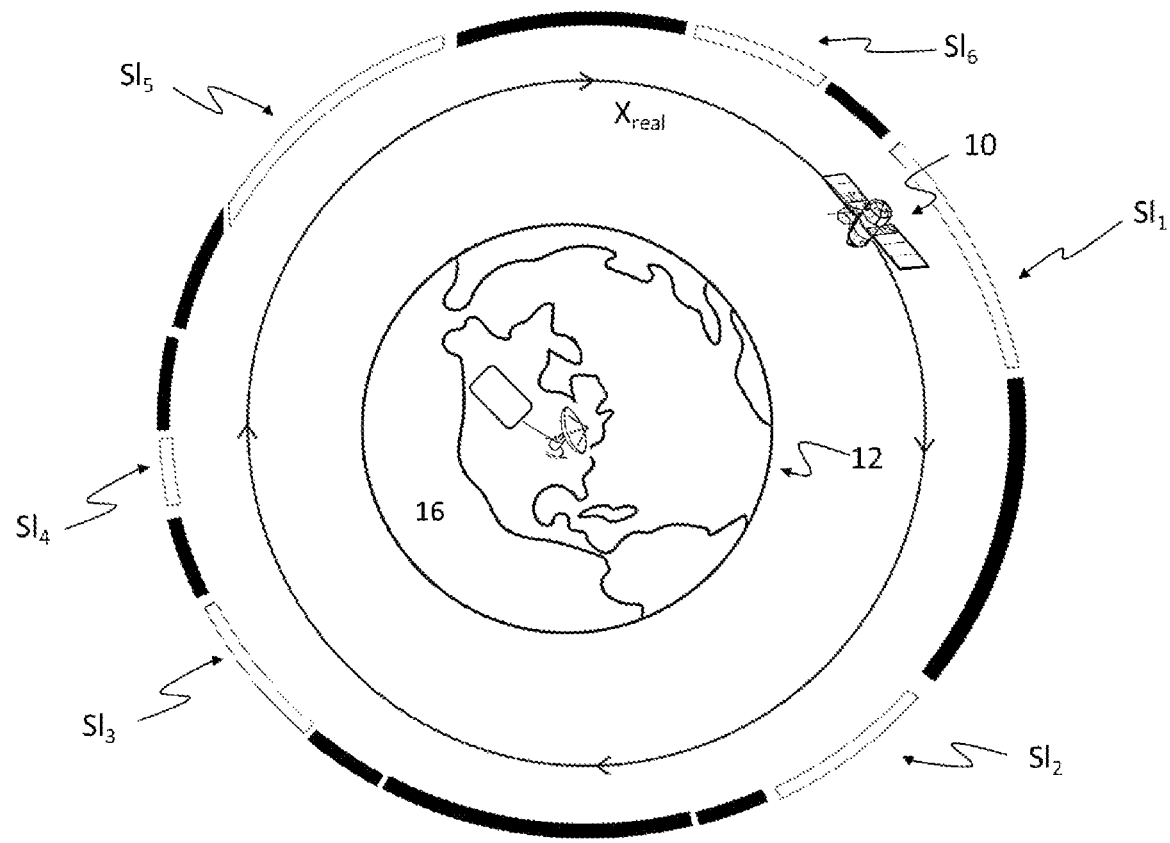
FIG. 8: is a schematic representation of an example of the free manoeuvre slots of the satellite.
Figure 9:
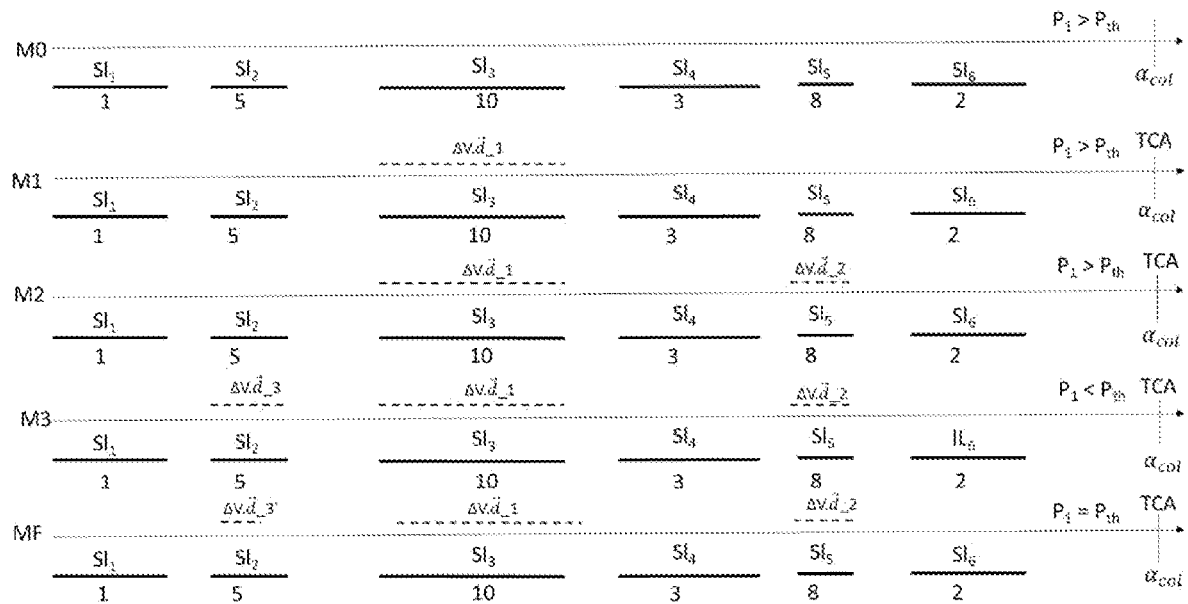
FIG. 9: is a temporal schematic representation of the collision probability calculation step according to several avoidance manoeuvres according to a second embodiment taking into account the free manoeuvre slots.

According to the example of FIG. 9, in correspondence with FIG. 8, the collision estimation method may comprise the determination of the best free manoeuvre slot $Sl_1$, $Sl_2$, $Sl_3$, $Sl_4$, $Sl_5$, $Sl_6$ during which an avoidance manoeuvre d can be performed so as to obtain the lowest probability of collision $P_1$. The collision estimation method can also comprise the determination of a plurality of consecutive avoidance manoeuvres $\Delta V \cdot \vec{d}$ each free manoeuvre slot $Sl_1$, $Sl_2$, $Sl_3$, $Sl_4$, $Sl_5$, $Sl_6$ associated with each avoidance manoeuvre $\Delta V \cdot \vec{d}$ to be selected so as to limit the number of avoidance manoeuvres $\Delta V \cdot \vec{d}$ to reduce the probability of collision as much as possible, that is to say to obtain a probability of collision $P_1$ that is less than or equal to a predefined threshold of probability $P_{th}$ of collision, preferably to obtain a probability of collision close to or even equal to the predefined threshold of probability $P_{th}$ of collision.

Five lines represent five successive stages M0, M1, M2, M3, MF of determining free manoeuvre slots $Sl_1$, $Sl_2$, $Sl_3$, $Sl_4$, $Sl_5$, $Sl_6$ and avoidance manoeuvres $\Delta V \cdot \vec{d}$ allowing to reduce the probability of collision $P_1$ of the satellite 10 with the piece of space debris $d_1$. More particularly, the first line represents a preliminary step M0 of determining the free manoeuvre slots $Sl_1$, $Sl_2$, $Sl_3$, $Sl_4$, $Sl_5$, $Sl_6$ allowing the execution of manoeuvres $\Delta V \cdot \vec{d}$ of avoiding and classifying the free manoeuvre slots $Sl_1$, $Sl_2$, $Sl_3$, $Sl_4$, $Sl_5$, $Sl_6$ determined according to a rating representative of the maximum possible radial separation on each of the free manoeuvre slots $Sl_1$, $Sl_2$, $Sl_3$, $Sl_4$, $Sl_5$, $Sl_6$ between the satellite 10 and the piece of debris $d_1$ at the considered time of closest approach TCA. The second line, the third line and the fourth line respectively represent a first step M1 of determining a first avoidance manoeuvre $\Delta V \cdot \vec{d}\_1$ a second step M2 of determining a second avoidance manoeuvre $\Delta V \cdot \vec{d}\_2$ and a third step M3 of determining a third avoidance manoeuvre $\Delta V \cdot \vec{d}\_3$ the first avoidance manoeuvre $\Delta V \cdot \vec{d}\_1$ being determined on the free manoeuvre slot $Sl_3$ having obtained the best rating, the second avoidance manoeuvre $\Delta V \cdot \vec{d}\_2$ being determined on the free manoeuvre slot $Sl_5$ having obtained the second best rating, the third avoidance manoeuvre $\Delta V \cdot \vec{d}\_3$ being determined on the free manoeuvre slot $Sl_2$ having obtained the third best rating. The fifth line represents a final step MF according to which the third avoidance manoeuvre $\Delta V \cdot \vec{d}\_3$ is optimised so as, for example, to limit the energy necessary for this third avoidance manoeuvre $\Delta V \cdot \vec{d}\_3$ allowing to obtain for example a collision probability $P_1$ equal or even closest to the predefined threshold of probability $P_{th}$ of collision.

The preliminary step M0 consists in determining the free manoeuvre slots $Sl_1$, $Sl_2$, $Sl_3$, $Sl_4$, $Sl_5$, $Sl_6$ allowing the execution of avoidance manoeuvres $\Delta V \cdot \vec{d}$ according to a duration of manoeuvre, a minimum time and a maximum time of avoidance manoeuvre $\Delta V \cdot \vec{d}$, which are defined as follows: the minimum time corresponds to the time on which manoeuvres can really begin. In general, said minimum time corresponds to the time of activation of the calculation of the manoeuvre to which a margin can be added corresponding, for example, to the minimum duration of preheating the nozzles of the thrust systems of the satellite 10.

The maximum time is the considered time of closest approach TCA, only the free manoeuvre slots $Sl_1$, $Sl_2$, $Sl_3$, $Sl_4$, $Sl_5$, $Sl_6$ which last longer than a minimum duration thus allowing a minimum thrust necessary for the change of orbit of the satellite 10 are kept such as, for example and in a non-limiting manner, a predefined minimum duration of five minutes.

The duration separating two consecutive free manoeuvre slots $Sl_1$, $Sl_2$ can also be taken into account during the determination of a plurality of avoidance manoeuvres $\Delta V \cdot \vec{d}$, a minimum duration between two avoidance manoeuvres $\Delta V \cdot \vec{d}$, that is to say between two thrusts that may be necessary. Consequently, only the free manoeuvre slots $Sl_1$, $Sl_2$, $Sl_3$, $Sl_4$, $Sl_5$, $Sl_6$ which allow a minimum duration between the thrusts already provided are kept, such as for example and in a non-limiting manner, a predefined duration of twenty minutes.

In a non-limiting manner, when an avoidance manoeuvre $\Delta V \cdot \vec{d}$ is determined on a free slot $Sl_1$, $Sl_2$, $Sl_3$, $Sl_4$, $Sl_5$, $Sl_6$ and another free adjacent slot $Sl_1$, $Sl_2$, $Sl_3$, $Sl_4$, $Sl_5$, $Sl_6$ is spaced by a duration less than the minimum duration previously defined, it is possible to trim it. Thus only the duration over a part of this other free slot $Sl_1$, $Sl_2$, $Sl_3$, $Sl_4$, $Sl_5$, $Sl_6$ is taken into account, keeping only the part where an avoidance manoeuvre can be placed by avoiding the part which would not meet the minimum duration constraint. In this particular case, it will be necessary to re-evaluate the rating of said other trimmed free manoeuvre slot $Sl_1$, $Sl_2$, $Sl_3$, $Sl_4$, $Sl_5$, $Sl_6$ in so far as its duration has changed.

Preferably, the preliminary step M0 also consists of classifying the free manoeuvre slots $Sl_1$, $Sl_2$, $Sl_3$, $Sl_4$, $Sl_5$, $Sl_6$ according to a rating representative of the maximum possible radial separation on each of the free manoeuvre slots $Sl_1$, $Sl_2$, $Sl_3$, $Sl_4$, $Sl_5$, $Sl_6$ between the satellite 10 and the piece of space debris $d_1$ at the considered time of closest approach TCA. For this purpose, as mentioned above, the purpose of an avoidance manoeuvre $\Delta V \cdot \vec{d}$ is to create a radial separation at the considered time of closest approach TCA. Consequently, the free manoeuvre slots $Sl_1$, $Sl_2$, $Sl_3$, $Sl_4$, $Sl_5$, $Sl_6$ which allow maximum radial separation must be used as a priority. This is why it is essential to calculate the radial separation $\Delta r$ at the considered time of closest approach TCA associated with each of the free manoeuvre slots $Sl_1$, $Sl_2$, $Sl_3$, $Sl_4$, $Sl_5$, $Sl_6$.

The determination of the radial separation $\Delta r$ at the considered time of closest approach TCA associated with each of the free manoeuvre slots $Sl_1$, $Sl_2$, $Sl_3$, $Sl_4$, $Sl_5$, $Sl_6$ firstly includes a step of determining the maximum duration d_max_sl of the avoidance manoeuvre $\Delta V \cdot \vec{d}$ relating to each of the free manoeuvre slots $Sl_1$, $Sl_2$, $Sl_3$, $Sl_4$, $Sl_5$, $Sl_6$. The maximum duration d_max_sl of the avoidance manoeuvre $\Delta V \cdot \vec{d}$ is for example the duration of the considered free manoeuvre slot if said duration is less than the maximum authorised duration d_max_aut of manoeuvre $\Delta V \cdot \vec{d}$ which can be linked for example and in non-limiting manner to the maximum available energy consumption of the propulsion device of the satellite 10 authorised for an avoidance manoeuvre $\Delta V \cdot \vec{d}$. According to another example, the maximum duration d_max_sl of the avoidance manoeuvre $\Delta V \cdot \vec{d}$ is the maximum duration d_max_aut of manoeuvre $\Delta V \cdot \vec{d}$ authorised when the duration of the free manoeuvre slot is greater than said maximum duration of manoeuvre $\Delta V \cdot \vec{d}$.

The determination of the radial separation $\Delta r$ at the considered time of closest approach TCA associated with each of the free manoeuvre slots $Sl_1$, $Sl_2$, $Sl_3$, $Sl_4$, $Sl_5$, $Sl_6$ also includes a calculation of the speed difference $\Delta V$ of the avoidance manoeuvre $\Delta V \cdot \vec{d}$ desired on each free manoeuvre slot $Sl_1$, $Sl_2$, $Sl_3$, $Sl_4$, $Sl_5$, $Sl_6$ according to the thrust PS desired to be applied to the satellite 10, the mass m of the satellite 10, and the maximum duration d_max_sl of the avoidance manoeuvre $\Delta V \cdot \vec{d}$ determined above, using the following equation:

$$\Delta V = (PS/M) \times d\_max\_sl \tag{26}$$

Determining the maximum radial separation $\Delta r$ for each of the free manoeuvre slots $Sl_1$, $Sl_2$, $Sl_3$, $Sl_4$, $Sl_5$, $Sl_6$ amounts to finding a direction of thrust $\vec{d}$ in the plane of the orbit, that is to say to determining the azimuth az, that is to say the angle between the speed V of the satellite and the direction of thrust $\vec{d}$ relating to the avoidance manoeuvre $\Delta V \cdot \vec{d}$ which maximises the radial separation $\Delta r$. There are two optimal attitudes, or azimuth az, to maximise the radial separation $\Delta r$: an azimuth (az) which increases the semi-major axis 'a' of the orbit of the satellite 10, that is to say a radial separation called positive radial separation and an azimuth (az+π) which decreases the semi-major axis 'a' of the orbit of the satellite 10, that is to say a radial separation called negative radial separation. This radial separation Or can be given by the following equation:

$$\Delta r = \left[ \frac{\partial r}{\partial a} \times \frac{\partial a}{\partial V_T} + \frac{\partial r}{\partial e_x} \times \frac{\partial e_x}{\partial V_T} + \frac{\partial r}{\partial e_y} \times \frac{\partial e_y}{\partial V_T} \right] \Delta V \cos(az) + \tag{27}$$

-continued $$\left[\frac{\partial r}{\partial e_x} \times \frac{\partial e_x}{\partial V_R} + \frac{\partial r}{\partial e_y} \times \frac{\partial e_y}{\partial V_R}\right] \Delta V \sin(az)$$

according to which, 'r' represents the radial position of the satellite, 'a' the semi-major axis of the orbit of the satellite, '$e_x$' and '$e_y$', orbital elements in a representation called circular representation, Vr the radial component of the increment of the speed of manoeuvre $\Delta V \cdot \vec{d}$, Vt the tangential component of the increment of the speed of manoeuvre $\Delta V \cdot \vec{d}$.

Consequently, the extremes of this function of the azimuth az can be found by finding the two solutions of the following equation:

$$\tan(az) = \frac{\frac{\partial r}{\partial e_x} \times \frac{\partial e_x}{\partial V_R} + \frac{\partial r}{\partial e_y} \times \frac{\partial e_y}{\partial V_R}}{\frac{\partial r}{\partial a} \times \frac{\partial a}{\partial V_T} + \frac{\partial r}{\partial e_x} \times \frac{\partial e_x}{\partial V_T} + \frac{\partial r}{\partial e_y} \times \frac{\partial e_y}{\partial V_T}} \quad (28)$$

according to which the partial derivatives of the radial position or of the satellite 10 can be determined by differentiation of the following equation:

$$r_{col} = \frac{a(1 - e_x^2 - e_y^2)}{1 + e_x \cos(\alpha_{col}) + e_y \sin(\alpha_{col})} \quad (29)$$

according to which, '$r_{col}$' represents the radial position of the satellite at the considered time of closest approach TCA, and $\alpha_{col}$ represents the argument of the latitude of collision.

Equation (29) allows to establish the following mathematical relationships to determine the parameters of the equation (28):

$$\frac{\partial r}{\partial a} = \frac{r_{col}}{a} \quad (30)$$

$$\frac{\partial r}{\partial e_x} = -\frac{r_{col}}{a(1 - e_x^2 - e_y^2)} [2ae_x + r_{col}\cos(\alpha_{col})] \quad (31)$$

$$\frac{\partial r}{\partial e_y} = -\frac{r_{col}}{a(1 - e_x^2 - e_y^2)} [2ae_y + r_{col}\sin(\alpha_{col})] \quad (32)$$

The partial derivatives of the orbital elements of the equation (28) are given by the following Gaussian equations:

$$\frac{\partial a}{\partial V_T} = \frac{2}{n^2 a} V_{man} \quad (33)$$

$$\frac{\partial e_x}{\partial V_T} = \frac{2}{V_{man}} [e_x + \cos(\alpha_{man})] \quad (34)$$

$$\frac{\partial e_y}{\partial V_T} = \frac{2}{V_{man}} [e_y + \sin(\alpha_{man})] \quad (35)$$

$$\frac{\partial e_x}{\partial V_R} = -\frac{1}{V_{man}} \left[\frac{r_{man}}{a} \sin(\alpha_{man}) + 2e_y\right] \quad (36)$$

$$\frac{\partial e_y}{\partial V_R} = \frac{1}{V_{man}} \left[\frac{r_{man}}{a} \cos(\alpha_{man}) + 2e_x\right] \quad (37)$$

according to which, $V_{man}$ represents the speed of the satellite 10 at the moment of the avoidance manoeuvre $\Delta V \cdot \vec{d}$, $r_{man}$ represents the radial position of the satellite 10 at the moment of the avoidance manoeuvre $\Delta V \cdot \vec{d}$, $\alpha_{man}$ represents the argument of the latitude of the satellite 10 at the moment of the avoidance manoeuvre $\Delta V \cdot \vec{d}$ more precisely at the middle time of the considered free manoeuvre slot.

According to the preliminary step M0, rating all the free manoeuvre slots $Sl_1$, $Sl_2$, $Sl_3$, $Sl_4$, $Sl_5$, $Sl_6$ can be carried out according to the determination of the maximum radial separation $\Delta r$, according to a positive radial separation or according to a negative radial separation. According to the example of FIG. 9, a rating out of 10 is distributed to all the free manoeuvre slots $Sl_1$, $Sl_2$, $Sl_3$, $Sl_4$, $Sl_5$, $Sl_6$ for which, the maximum radial separation $\Delta r$ has been determined according to the equation (27). To this end, the free manoeuvre slot including the highest rating is the third free manoeuvre slot $Sl_3$. Then come, in descending rating order, the fifth free manoeuvre slot $Sl_5$, the second free manoeuvre slot $Sl_2$, the fourth free manoeuvre slot $Sl_4$, the sixth free manoeuvre slot $Sl_3$ and finally the first free manoeuvre slot $Sl_1$.

Following the preliminary step M0, in step M1, the determination of the probability of collision $P_1$ of the satellite 10 with the piece of debris $d_1$ is carried out according to a first avoidance manoeuvre $\Delta V \cdot \vec{d}$ placed on the third free manoeuvre slot $Sl_3$. The speed difference $\Delta V\_1$ associated with the first avoidance manoeuvre $\Delta V \cdot \vec{d}\_1$ is the maximum authorised speed difference relative to the third free manoeuvre slot $Sl_3$ according to the equation (26). The direction $\vec{d}\_1$ associated with the first avoidance manoeuvre $\Delta V \cdot \vec{d}\_1$ corresponds to the attitude determined to optimise the radial separation $\Delta r$, that is to say a direction $\vec{d}\_1$ corresponding to the azimuth az determined according to the equation (28), either for a positive radial separation $\Delta r$, or for a negative radial separation $\Delta r$.

From the determination of the first avoidance manoeuvre $\Delta V \cdot \vec{d}\_1$ and the choice of the third free manoeuvre slot $Sl_3$, according to the equation (7) and the equation (9) relating to FIG. 3, the calculation means of the satellite are configured to propagate the true orbit $X_{real}$ of the satellite 10, taking into account the first avoidance manoeuvre $\Delta V \cdot \vec{d}\_1$ until the considered time of closest approach TCA so as to determine the probability of collision $P_1$ with the piece of space debris $d_1$ at the considered time of closest approach TCA. According to FIG. 9, and for the purpose of describing a plurality of avoidance manoeuvres, it should be considered that the probability of collision $P_1$ determined after the first avoidance manoeuvre $\Delta V \cdot \vec{d}\_1$ remains too high with regard to the predefined threshold of probability $P_{th}$ of collision.

To this end, in step M2, the determination of the probability of collision $P_1$ of the satellite 10 with the piece of debris $d_1$ is carried out according to a second avoidance manoeuvre $\Delta V \cdot \vec{d}\_2$ placed on the fifth free manoeuvre slot $Sl_5$, the calculation of the probability of collision $P_1$ of the satellite 10 taking into account the combination of the first avoidance manoeuvre $\Delta V \cdot \vec{d}\_1$ with the second avoidance manoeuvre $\Delta V \cdot \vec{d}\_2$. The speed difference $\Delta V\_2$ associated with the second avoidance manoeuvre $\Delta V \cdot \vec{d}\_2$ is the maximum authorised speed difference relative to the fifth free manoeuvre slot $Sl_5$ according to the equation (26). The direction $\vec{d}\_2$ associated with the second avoidance manoeuvre $\Delta V \cdot \vec{d}\_2$ corresponds to the attitude determined to optimise the radial separation $\Delta r$, that is to say a direction $\vec{d}\_2$ corresponding to the azimuth az determined according to the equation (28), and according to a radial separation $\Delta r$ of the same type as the radial separation $\Delta r$ associated with the first avoidance manoeuvre $\Delta V \cdot \vec{d}\_1$, that is to say either positive or negative.

From the determination of the second avoidance manoeuvre $\Delta V \cdot \vec{d}\_2$, the choice of the fifth free manoeuvre slot $Sl_5$, according to the equation (7) and the equation (9) relating to FIG. 3, the calculation means of the satellite are configured to propagate the true orbit $X_{real}$ of the satellite 10, taking into account the first avoidance manoeuvre $\Delta V \cdot \vec{d}\_1$ and the second avoidance manoeuvre $\Delta V \cdot \vec{d}\_2$ until the considered time of closest approach TCA so as to determine the probability of collision $P_1$ with the piece of space debris $d_1$ at the considered time of closest approach TCA. To this end, the orbital position difference $\Delta X_{man}(TCA_{ref})$ defined according to the equation (7) and the equation (9) is a difference comprising the orbital position difference $\Delta Xsl3$ due to the first avoidance manoeuvre $\Delta V \cdot \vec{d}\_1$ during the third free manoeuvre slot $Sl_3$ and the orbital position difference $\Delta Xsl5$ due to the second avoidance manoeuvre $\Delta V \cdot \vec{d}\_2$ during the fifth free manoeuvre slot $Sl_5$, that is to say $\Delta X_{man}(TCA_{ref})=\Delta X_{man}(sl3)+\Delta X_{man}(sl5)+Xreal_{-a}(TCA_{ref})-Xreal_{-b}(TCA_{ref})$, the orbital differences $\Delta X_{man}(sl3)$ and $\Delta X_{man}(sl5)$ generated during the third free manoeuvre slot $Sl_3$ and the fifth free manoeuvre slot $Sl_5$ being dependent on the thrust vector of the satellite 10 relating respectively to the thrust of the first avoidance manoeuvre $\Delta V \cdot \vec{d}\_1$ and to the thrust of the second avoidance manoeuvre $\Delta V \cdot \vec{d}\_2$. According to FIG. 9, and for the purpose of describing a plurality of avoidance manoeuvres, it should be considered that the probability of collision $P_1$ determined after the first avoidance manoeuvre $\Delta V \cdot \vec{d}\_1$ and the second avoidance manoeuvre $\Delta V \cdot \vec{d}\_2$ remains too high with regard to the predefined threshold of probability $P_{th}$ of collision.

To this end, in step M3, the determination of the probability of collision $P_1$ of the satellite 10 with the piece of debris $d_1$ is carried out according to a third avoidance manoeuvre $\Delta V \cdot \vec{d}\_3$ placed on the second free manoeuvre slot $Sl_2$, the calculation of the probability of collision $P_1$ of the satellite 10 taking into account the combination of the first avoidance manoeuvre $\Delta V \cdot \vec{d}\_1$ with the second avoidance manoeuvre $\Delta V \cdot \vec{d}\_2$ and also with the third avoidance manoeuvre $\Delta V \cdot \vec{d}\_3$. The speed difference $\Delta V\_3$ associated with the third avoidance manoeuvre $\Delta V \cdot \vec{d}\_3$ is the maximum authorised speed difference relative to the second free manoeuvre slot $Sl_2$ according to the equation (26). The direction $\vec{d}\_3$ associated with the third avoidance manoeuvre $\Delta V \cdot \vec{d}\_3$ corresponds to the attitude determined to optimise the radial separation $\Delta r$, that is to say a direction $\vec{d}\_3$ corresponding to the azimuth az determined according to the equation (28), and according to a radial separation $\Delta r$ of the same type as the radial separation $\Delta r$ associated with the first avoidance manoeuvre $\Delta V \cdot \vec{d}\_1$ and the second avoidance manoeuvre $\Delta V \cdot \vec{d}\_2$, that is to say either positive or negative.

From the determination of the third avoidance manoeuvre $\Delta V \cdot \vec{d}\_3$, the choice of the second free manoeuvre slot $Sl_2$, according to the equation (7) and the equation (9) relating to FIG. 3, the calculation means of the satellite 10 are configured to propagate the true orbit $X_{real}$ of the satellite 10, taking into account the first avoidance manoeuvre $\Delta V \cdot \vec{d}\_1$, the second avoidance manoeuvre $\Delta V \cdot \vec{d}\_2$ and the third avoidance manoeuvre $\Delta V \cdot \vec{d}\ 3$ until the considered time of closest approach TCA so as to determine the probability of collision $P_1$ with the piece of space debris $d_1$ on the considered time of closest approach TCA. For this purpose, the orbital position difference $\Delta X_{man}$ defined according to the equation (7) and the equation (9) is a difference comprising the orbital position difference $\Delta Xsl_3$ due to the first avoidance manoeuvre $\Delta V \cdot \vec{d}\_1$ during the third free manoeuvre slot $Sl_3$, the orbital position difference $\Delta Xsl5$ due to the second avoidance manoeuvre $\Delta V \cdot \vec{d}\_2$ during the fifth free manoeuvre slot $Sl_5$ and the orbital position difference $\Delta Xsl2$ due to the third avoidance manoeuvre $\Delta V \cdot \vec{d}\_3$ during the second free manoeuvre slot $Sl_2$, that is to say $\Delta X_{man}(TCA_{ref})=\Delta X_{man}(Sl_3)+\Delta X_{man}(sl5)+\Delta X_{man}(sl2)+X_{real\_a}(TCA_{ref})-X_{real\_b}(TCA_{ref})$, the orbital differences $\Delta X_{man}(sl3)$, $\Delta X_{man}(sl5)$ and respectively $\Delta X_{man}(sl2)$ generated during the third free manoeuvre slot $Sl_3$, during the fifth free manoeuvre slot $Sl_5$ and respectively during the second free manoeuvre slot $Sl_2$ being depending on the thrust vector of the satellite 10 relative to the thrust of the first avoidance manoeuvre $\Delta V \cdot \vec{d}\_1$, to the thrust of the second avoidance manoeuvre $\Delta V \cdot \vec{d}\ \_2$ and respectively to the thrust of the third avoidance manoeuvre $\Delta V \cdot \vec{d}\_3$.

Figure 10:
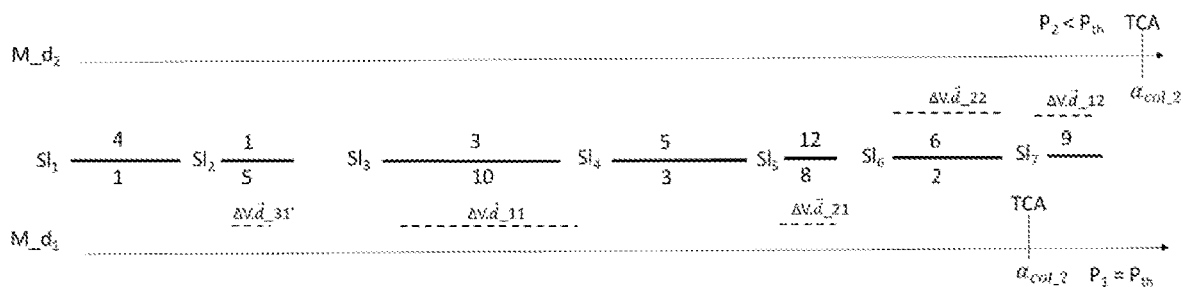
FIG. 10: is a temporal schematic representation similar to FIG. 9 according to two pieces of space debris risking a collision with the satellite.

According to FIG. 9, the probability of collision $P_1$ determined after the first avoidance manoeuvre $\Delta V \cdot \vec{d}\_1$ in combination with the second avoidance manoeuvre $\Delta V \cdot \vec{d}\_2$ and with the third avoidance manoeuvre $\Delta V \cdot \vec{d}\_3$ is lower at the predefined threshold of probability $P_{th}$ of collision. In this case, according to the invention, it is possible to add an optimisation step MF comprising the optimisation of the third avoidance manoeuvre $\Delta V \cdot \vec{d}\_3$, so as, for example and in a non-limiting manner, to limit the energy required for this third avoidance manoeuvre $\Delta V \cdot \vec{d}\_3$ allowing to obtain, for example, a probability of collision $P_1$ equal to or even closest to the predefined threshold of probability $P_{th}$ of collision. In this respect, the collision probability $P_1$ can be recalculated according to a speed difference $\Delta V\_3$ of the third avoidance manoeuvre $\Delta V \cdot \vec{d}\_3$ which is reduced with regard to the initial speed difference, the initial speed difference possibly being a maximum speed difference. The direction $\vec{d}\_3$ of the third avoidance manoeuvre $\Delta V \cdot \vec{d}\_3$ can also be adjusted. It is advantageously possible to perform the collision probability $P_1$ calculations according to either a positive radial separation, or according to a negative radial separation, the type of separation allowing to obtain the lowest probability $P_1$ of collision being that retained for the set of avoidance manoeuvres $\Delta V \cdot \vec{d}$ According to FIG. 10, the collision estimation method can relate to a plurality of pieces of space debris for which avoidance manoeuvres $\Delta V \cdot \vec{d}$ must be placed on the free manoeuvre slots $Sl_1$, $Sl_2$, $Sl_3$, $Sl_4$, $Sl_5$, $Sl_6$. To this end, identically to FIG. 9, a step $M\_d_1$ relating to the determination of the probability of collision $P_1$ with the first piece of space debris $d_1$ according to the considered time of closest approach TCA and corresponding to an argument of the latitude $\alpha_{col1}$ of the satellite at this considered time of closest approach TCA is represented. This step M_d$_1$ relating to the calculation of the probability of collision P$_1$ was carried out according to a first avoidance manoeuvre $\Delta V \cdot \vec{d}\_11$ placed on the third free manoeuvre slot Sl$_3$ including the best rating, that is to say a rating of 10, the first avoidance manoeuvre $\Delta V \cdot \vec{d}\_11$ having to be carried out in combination with a second avoidance manoeuvre $\Delta V \cdot \vec{d}\_21$ placed on the fifth free manoeuvre slot Sl$_5$ and including the second best rating, that is to say a rating of 8, and in combination with a third avoidance manoeuvre $\Delta V \cdot \vec{d}\_31$ placed on the second free manoeuvre slot Sl$_2$ and including the third best rating, that is to say a rating of 5.

According to the hypothesis that a second piece of space debris d$_2$ must be avoided by the satellite 10, according to the same principle as that set out in FIG. 9, the free manoeuvre slots allowing manoeuvres $\Delta V \cdot \vec{d}$ to avoid the second piece of space debris d$_2$ are identified and noted. For this purpose, since the argument of the latitude $\alpha_{col2}$ of the satellite 10 for which the collision may be probable with the second piece of space debris d$_2$ corresponds to a time of closest approach subsequent to the time of closest approach linked to the first piece of space debris d$_1$, the six free manoeuvre slots Sl$_1$, Sl$_2$, Sl$_3$, Sl$_4$, Sl$_5$, Sl$_6$ identified for potentially performing the avoidance manoeuvres $\Delta V \cdot \vec{d}$ linked to the first piece of space debris d$_1$ are also potentially free manoeuvre slots Sl$_1$, Sl$_2$, Sl$_3$, Sl$_4$, Sl$_5$, Sl$_6$ during which avoidance manoeuvres $\Delta V \cdot \vec{d}$ linked to the second piece of space debris d$_2$ are achievable. A seventh free manoeuvre slot Sl$_7$ located in the time between the considered time of closest approach TCA with the first piece of space debris d$_1$ and the considered time of closest approach TCA with the second piece of debris d$_2$ is determined.

In the same way as in FIG. 9, a rating is allocated to each of the free manoeuvre slots Sl$_1$, Sl$_2$, Sl$_3$, Sl$_4$, Sl$_5$, Sl$_6$, Sl$_7$ potentially allowing manoeuvres $\Delta V \cdot \vec{d}$ to avoid the second piece of space debris d$_2$. According to the non-limiting example of FIG. 10, the fifth free manoeuvre slot Sl$_5$ includes the best rating, that is to say a rating of 12. The seventh free manoeuvre slot Sl$_7$ includes the second best rating, that is to say a rating of 9, and the sixth free manoeuvre slot Sl$_6$ includes the third best rating, that is to say a rating of 6. The other free manoeuvre slots include ratings lower than that of the third best free manoeuvre slot. The free manoeuvre slots Sl$_2$, Sl$_3$, Sl$_5$, already provided for the manoeuvres $\Delta V \cdot \vec{d}$ to avoid the first piece of space debris d$_1$ cannot also be provided for the manoeuvres $\Delta V \cdot \vec{d}$ to avoid the second piece of debris d$_2$. To this end, the fifth free manoeuvre slot Sl$_5$, although including the best representative rating of the maximum radial separation $\Delta r$ of the satellite 10 possible on this free manoeuvre slot, cannot be provided for an avoidance manoeuvre $\Delta V \cdot \vec{d}$ of the second piece of debris d$_2$.

In a similar manner to the first piece of space debris d$_1$, manoeuvres to avoid the second piece of space debris d$_2$ are determined on the available free manoeuvre slots so as to obtain a probability of collision P$_2$ between the satellite 10 and the second piece of space debris d$_2$ less than or even equal to the predefined threshold of probability P$_{th}$ of collision. More particularly and in a non-limiting manner, a first manoeuvre $\Delta V \cdot \vec{d}\_12$ of avoiding the second piece of space debris d$_2$ is determined on the seventh free manoeuvre slot Sl$_7$, a second avoidance manoeuvre $\Delta V \cdot \vec{d}\_22$ having to be carried out during the sixth free manoeuvre slot Sl$_6$ is also identified so as to obtain a probability of collision P$_2$ between the satellite 10 and the second piece of space debris d$_2$ less than or even equal to the predefined threshold of probability P$_{th}$ of collision.

A non-limiting example of a flowchart relating to the method 100 for estimating collision between the satellite 10 in orbit around the Earth 12 and a piece of space debris d$_1$ is illustrated in FIG. 11. The first three steps 110, 120, 130 are steps carried out on the ground, for example, at the satellite control centre 18. In addition to collecting orbital data of the piece space debris d$_1$ through agencies for monitoring the piece of space debris in space, the satellite control centre 18 is configured to perform a first step of obtaining 110 the reference orbit X$_{ref}$ of the satellite 10, of the orbit X$_{d1}$ of the piece of space debris d$_1$ and of their associated covariance COV$_{sat}$, COV$_{d1}$. A second step comprises the determination 120 of an ephemeris of state transition data $\varphi(t, t_0)$ representative of the trajectory of the reference orbit X$_{ref}$ of the satellite 10. More particularly, the ephemeris of state transition data $\varphi(t, t_0)$ can be an ephemeris of state transition matrix. The last step of the method 100 carried out on the ground is a step 130 of communicating the reference orbit X$_{ref}$ and the orbit X$_{d1}$ of the piece of space debris d$_1$ as well as their associated covariance COV$_{sat}$, COV$_{d1}$, and the ephemeris of state transition data $\varphi(t, t_0)$ to the satellite 10. It should be noted that by default, the orbital data relating to the at least one piece of space debris d$_1$ are also communicated to the satellite 10. A predetermined reference time of closest approach TCA$_{ref}$ between the satellite 10 and the at least one piece of space debris d$_1$ is also communicated to the satellite 10.

Preferably, more particularly, in order to limit the volume of data transmitted to the satellite 10, the communication step 130 can comprise the transmission from the satellite control centre 18 of an activation time t$_{cur}$ for the calculation of the collision probability P$_1$; a state transition matrix $\varphi(t_{cur} \rightarrow TCA_{ref})$ between the activation time t$_{cur}$ and the reference time of closest approach TCA$_{ref}$; the reference orbital position of the satellite at the activation time t$_{cur}$ and the reference time of closest approach TCA$_{ref}$; and the orbital position and the covariance of the piece of space debris d$_1$ at the reference time of closest approach TCA$_{ref}$.

The following steps are carried out on board the satellite 10. Since the satellite embeds its own geolocation means, a first step on board the satellite 10 consists in determining 140 the true orbital position X$_{real}$ of the satellite 10. In order to be able to calculate a probability P$_1$ of collision with the at least one piece of space debris d$_1$, the method 100 includes a step 150 of propagating the true orbit X$_{real}$(t) of the satellite 10, the orbit X$_{d1}$ of the piece of space debris d$_1$, and their associated covariance COV$_{sat}$, COV$_{d1}$, up to the time of closest approach TCA according to the ephemeris of state transition data $\varphi(t, t_0)$ and the reference orbit X$_{ref}$ of the satellite 10. It should be noted according to FIG. 11, that an optional step of determining 155 a real time of closest approach TCA$_{real}$ can be determined according to the description of FIG. 4. To this end, according to the method 100 for estimating collision between the satellite in orbit around the Earth 12 and the at least one piece of space debris d$_1$, a step 160 of calculating a probability P$_1$ of collision between the satellite 10 and the at least one piece of space debris d$_1$ can be carried out either at the reference time of closest approach TCA$_{ref}$, or, preferably at the time of closest approach TCA$_{real}$ determined in the previous optional step.

Steps 170 to 200 relate more particularly to steps linked to the determination of the probability of collisions after a first collision avoidance manoeuvre $\Delta V \cdot \vec{d}\_1$ allowing to reduce the probability of collision if said probability is for example and in a non-limiting manner greater than a predefined threshold of probability $P_{th}$ of collision. According to this hypothesis, the method comprises a step 170 of determining a first avoidance manoeuvre $\Delta V \cdot \vec{d}\_1$ of the at least one piece of space debris $d_1$ on a predetermined time of the first avoidance manoeuvre $\Delta V \cdot \vec{d}\_1$ according to a thrust of the satellite 10 optimising the radial separation from the true orbit $X_{real}(t)$ of the satellite 10. The first avoidance manoeuvre having a direct effect on the true orbit $X_{real}$ of the satellite, the method 100 comprises a step 180 of correcting the true orbital position $X_{real}(t)$ of the satellite 10 at the time of the first avoidance manoeuvre $\Delta V \cdot \vec{d}\_1$ according to a first orbital correction $\Delta X_{man}$ dependent on the thrust vector of the satellite 10 relating to the first avoidance manoeuvre $\Delta V \cdot \vec{d}\_1$ in accordance with the description of FIG. 3. For the purposes of calculating the probability $P_1$ of collision taking into account this first avoidance manoeuvre $\Delta V \cdot \vec{d}\_1$, the method 100 comprises a step of propagating 190 a first corrected true orbit of the satellite 10 from the corrected true orbital position $X_{real}(t)$ and its covariance $COV_{sat}$ until the considered time of closest approach TCA according to the ephemeris of state transition data $\varphi(t, t_0)$ and the reference orbit $X_{ref}$ of the satellite 10 or more particularly according to the state transition matrix $\varphi$ between the activation time $t_{cur}$ of the calculation of a first new probability of collision $P_1$ and the reference time of closest approach $TCA_{ref}$.

The method 100 includes, after the determination of the first corrected true orbit of the satellite 10, a step 200 of calculating the first new probability of collision $P_1$ between the satellite 10 and the at least one piece of space debris $d_1$ at the considered time of closest approach TCA according to the first corrected true $X_{real}(t)$ orbit of the satellite 10.

Steps 210 to 240 relate more particularly to steps linked to the determination of the probability of collisions after a second collision avoidance manoeuvre $\Delta V \cdot \vec{d}\_2$ allowing to reduce the new probability of collision after the first avoidance manoeuvre $\Delta V \cdot \vec{d}\_1$ if said probability is for example and in a non-limiting way always higher than the predefined threshold of probability $P_{th}$ of collision. To this end, the method 100 may comprise a step 210 of determining a second avoidance manoeuvre $\Delta V \cdot \vec{d}\_2$ of the at least one piece of space debris $d_1$ at a time of the second predetermined avoidance manoeuvre $\Delta V \cdot \vec{d}\_2$ according to a thrust of the satellite 10 optimising the radial separation from the first corrected true orbit $X_{real}$ of the satellite 10 determined in step 190. The second avoidance manoeuvre $\Delta V \cdot \vec{d}\_2$ having a direct effect on the first corrected true orbit of the satellite 10, the method 100 comprises a step 220 of correcting the orbital position of the satellite 10 on the first corrected true orbit, at the time of the second avoidance manoeuvre $\Delta V \cdot \vec{d}\_2$ according to a second orbital correction dependent on the thrust vector of the satellite 10 relating to the second avoidance manoeuvre $\Delta V \cdot \vec{d}\_2$. For the purpose of calculating the probability $P_1$ of collision taking into account this second avoidance manoeuvre $\Delta V \cdot \vec{d}\_2$, the method 100 comprises a step 230 of propagating a second corrected true orbit of the satellite 10 from the corrected orbital position of the satellite 10 in the previous step 220 and its covariance $COV_{sat}$ until the considered time of closest approach TCA according to the ephemeris of state transition data $\varphi(t, t_0)$ and the reference orbit $X_{ref}$ of the satellite 10 or more particularly according to the state transition matrix $\varphi$ between the activation time $t_{cur}$ of the calculation of a second new probability of collision $P_1$ and the reference time of closest approach $TCA_{ref}$.

The method 100 includes, after the determination of the second corrected true orbit of the satellite 10, a step 240 of calculating the second new probability $P_1$ of collision between the satellite 10 and the at least one piece of space debris $d_1$ at the considered time of closest approach TCA according to the second corrected true orbit of the satellite 10.

If after steps 170 to 240, the second new probability $P_1$ of collision was still too high, that is to say for example still higher than the predefined threshold of probability $P_{th}$ of collision, other steps similar to steps 170 to 200 and 210 to 240 can be added so as to determine other avoidance manoeuvres allowing to reduce the probability of collision between the satellite 10 and the at least one piece of space debris.

As described in FIG. 6, in the case of a free choice of the times of the avoidance manoeuvres $\Delta V \cdot \vec{d}$, preferably the avoidance manoeuvres can take place according to an argument of the latitude $\alpha_{man}$ of manoeuvre opposite to the argument of the latitude $\alpha_{col}$ of collision with the piece of space debris $d_1$, so as to optimise the radial separation with the current orbit of the satellite 10.

In particular and as described with reference to FIG. 9, in the case of constraints of free manoeuvre time slots $Sl_1$, $Sl_2$, $Sl_3$, $Sl_4$, $Sl_5$, $Sl_6$, according to FIG. 12, the method 100 may comprise a first step of determining 300 a plurality of free manoeuvre time slots $Sl_1$, $Sl_2$, $Sl_3$, $Sl_4$, $Sl_5$, $Sl_6$ each allowing the execution of a manoeuvre $\Delta V \cdot \vec{d}$ to avoid at least one piece of space debris $d_1$. Although it would be possible to allocate to each avoidance manoeuvre $\Delta V \cdot \vec{d}$ a manoeuvre time $\Delta V \cdot \vec{d}$ during a free manoeuvre time slot $Sl_1$, $Sl_2$, $Sl_3$, $Sl_4$, $Sl_5$, $Sl_6$ distinct from another free time slot $Sl_1$, $Sl_2$, $Sl_3$, $Sl_4$, $Sl_5$, $Sl_6$ of another avoidance manoeuvre $\Delta V \cdot \vec{d}$, preferably, the method comprises a step of determining 310 the maximum possible radial separation $\Delta r$ between the satellite 10 and the at least one piece of space debris $d_1$ at the considered time of closest approach TCA on each of the determined free manoeuvre slots $Sl_1$, $Sl_2$, $Sl_3$, $Sl_4$, $Sl_5$, $Sl_6$ then a step of classifying 320 the free time slots $Sl_1$, $Sl_2$, $Sl_3$, $Sl_4$, $Sl_5$, $Sl_6$ according to a rating representative of the radial separation $\Delta r$ determined for each free manoeuvre slot $Sl_1$, $Sl_2$, $Sl_3$, $Sl_4$, $Sl_5$, $Sl_6$. Finally, the method 100 includes a step of allocating 330 to each avoidance manoeuvre $\Delta V \cdot \vec{d}$, the free manoeuvre time slot $Sl_1$, $Sl_2$, $Sl_3$, $Sl_4$, $Sl_5$, $Sl_6$ with the best determined rating distinct from the free time slot $Sl_1$, $Sl_2$, $Sl_3$, $Sl_4$, $Sl_5$, $Sl_6$ of another avoidance manoeuvre $\Delta V \cdot \vec{d}$.

The method according to the invention can for example be implemented by devices of the device 400 type as shown in FIG. 13. The device 400 for implementing the method for adjusting the orbital trajectory of the satellite 10 can comprise a processor type information processing unit 402 such as, for example and in a non-limiting manner, a processor specialised in signal processing, or else a microcontroller, or any other type of circuit allowing to execute software type instructions. The device 400 also includes random access memory 404 associated with the information processing unit

402. The information processing unit 402 is configured to execute a program, also called a computer program, comprising instructions implementing the method 100 for adjusting the orbital trajectory of a satellite 10 described above. The instructions are loaded into the random access memory of the device 400 from any type of storage medium 406 such as, for example and in a non-limiting manner, a memory of the non-volatile type or an external memory such as a removable storage memory card. The instructions can also be loaded via a connection to a communication network.

The computer program, comprising instructions implementing the method 100 for adjusting the orbital trajectory of the satellite 10 can also be implemented in hardware form by a machine or by an integrated circuit specific to an application or else by an electronic circuit of programmable logic network type.

It should be understood that the detailed description of the object of the invention, given only by way of illustration, does not in any way constitute a limitation, the technical equivalents also being comprised in the scope of the present invention.

The invention claimed is:

1. A method for estimating collision between a satellite in orbit around the Earth and at least one piece of space debris, the method including the following steps implemented by information processing means on the ground:
   obtaining a reference orbit of the satellite and its covariance and an orbit of the piece of space debris and its covariance;
   determining a reference time of closest approach;
   determining at least one state transition matrix allowing propagation of the reference orbit of the satellite and its covariance between an activation time and the reference time of closest approach;
   communicating to the satellite at least the following pieces of information: the activation time, the reference orbit of the satellite at the activation time and at the reference time of closest approach, the orbit of the piece of space debris and its covariance at the reference time of closest approach, and the state transition matrix;
the method including the following steps implemented by calculation means on board the satellite:
   determining in real time a true orbit of the satellite at the activation time by a navigation device of the satellite;
   propagating the true orbit of the satellite and its covariance up to the reference time of closest approach according to the state transition matrix, the reference orbit of the satellite at the reference time of closest approach, and an orbital difference between the true orbit and the reference orbit of the satellite at the activation time;
   calculating a first probability of collision between the satellite and the piece of space debris according to orbital positions of the satellite and of the piece of debris at a time of closest approach corresponding to the reference time of closest approach or to a real time of closest approach calculated by taking into account the true orbit of the satellite, so as to evaluate the need to modify the orbital trajectory of the satellite, each orbital position of the satellite and respectively of the piece of space debris being obtained from the orbit of the satellite and respectively of the piece of space debris.

2. The method according to claim 1, wherein the step of calculating the first probability of collision, implemented by calculation means on board the satellite, comprises maximising the first probability of collision by dilution of covariances of the orbital positions of the satellite and of the piece of space debris.

3. The method according to claim 1 further comprising the following steps implemented by calculation means on board the satellite, when the first collision probability is greater than a predefined collision probability threshold:
   determining a first avoidance manoeuvre of the piece of space debris at a time of the first avoidance manoeuvre predetermined according to a first thrust of the satellite optimising a radial separation from the true orbit of the satellite;
   correcting the true orbital position of the satellite at the time of the first avoidance manoeuvre according to a first orbital correction dependent on a thrust vector of the satellite relating to the first avoidance manoeuvre;
   propagating a second corrected true orbit of the satellite from the corrected true orbital position and its covariance up to the time of closest approach according to the state transition matrix and the reference orbit of the satellite;
   calculating a second probability of collision between the satellite and the piece of space debris at the time of closest approach according to the second true orbit of the satellite.

4. The method according to claim 3 further comprising the following steps implemented by calculation means on board the satellite, when the second probability of collision is greater than the predefined collision probability threshold:
   determining a second avoidance manoeuvre of the piece of space debris at a time of a second avoidance manoeuvre predetermined according to a second thrust of the satellite optimising a radial separation from the second true orbit of the satellite;
   correcting the orbital position of the satellite on the second true orbit, at the time of the second avoidance manoeuvre, according to a second orbital correction dependent on a thrust vector of the satellite relating to the second avoidance manoeuvre;
   propagating a third corrected true orbit of the satellite from the corrected orbital position of the satellite in the previous step and its covariance up to the time of closest approach according to the state transition matrix and the reference orbit of the satellite;
   calculating a third probability of collision between the satellite and the piece of space debris at the time of closest approach according to the third true orbit of the satellite.

5. The method according to claim 3, according to which the time of the avoidance manoeuvres takes place according to a latitude argument of manoeuvre opposed to a latitude argument of collision with the piece of space debris.

6. The method according to claim 3, according to which the time of the avoidance manoeuvres is determined according to the following steps:
   determining a plurality of free manoeuvre time slots each allowing the execution of a manoeuvre to avoid the piece of space debris;
   allocating to each avoidance manoeuvre a manoeuvre time during a determined free manoeuvre time slot distinct from a free time slot allocated to another avoidance manoeuvre.

7. The method according to claim 3, according to which each orbital correction relating to each avoidance manoeuvre is determined according to the following steps:

propagating the true orbit of the satellite up to the time of the avoidance manoeuvre so as to obtain an orbital position before the manoeuvre;

evaluating the effect of the manoeuvre applied to the orbit before the manoeuvre at the time of the avoidance manoeuvre so as to determine the true orbit after the avoidance manoeuvre at the time of the avoidance manoeuvre;

propagating the orbit before the manoeuvre up to the time of closest approach so as to obtain an orbital position of the true orbit without avoidance manoeuvre at the time of closest approach;

propagating the orbital position after the manoeuvre up to the time of closest approach so as to obtain an orbital position of the true orbit with avoidance manoeuvre at the time of closest approach;

determining the orbital position difference at the time of closest approach according to the effect of the manoeuvre, according to the orbital position of the true orbit without avoidance manoeuvre at the time of closest approach and according to the orbital position of the true orbit with avoidance manoeuvre at the time of closest approach.

8. An information storage medium storing a computer program comprising a first set of instructions for implementing, by a first processor, the steps on the ground of the method according to claim 1, when the program is read and executed by the first processor, and comprising a second set of instructions for implementing, by a second processor, the steps on board the satellite of the method for estimating collision between a satellite in orbit around the Earth and at least one piece of space debris, the method including the following steps implemented by information processing means on the ground:

obtaining a reference orbit of the satellite and its covariance and an orbit of the piece of space debris and its covariance;

determining a reference time of closest approach;

determining at least one state transition matrix allowing propagation of the reference orbit of the satellite and its covariance between an activation time and the reference time of closest approach;

communicating to the satellite at least the following pieces of information: the activation time, the reference orbit of the satellite at the activation time and at the reference time of closest approach, the orbit of the piece of space debris and its covariance at the reference time of closest approach, and the state transition matrix;

the method including the following steps implemented by calculation means on board the satellite:

determining in real time a true orbit of the satellite at the activation time by a navigation device of the satellite;

propagating the true orbit of the satellite and its covariance up to the reference time of closest approach according to the state transition matrix, the reference orbit of the satellite at the reference time of closest approach, and an orbital difference between the true orbit and the reference orbit of the satellite at the activation time;

calculating a first probability of collision between the satellite and the piece of space debris according to orbital positions of the satellite and of the piece of debris at a time of closest approach corresponding to the reference time of closest approach or to a real time of closest approach calculated by taking into account the true orbit of the satellite, so as to evaluate the need to modify the orbital trajectory of the satellite, each orbital position of the satellite and respectively of the piece of space debris being obtained from the orbit of the satellite and respectively of the piece of space debris, when the program is read and executed by the first processor.

9. The method according to claim 1 further including a step implemented by the calculation means on board the satellite preceding the step of calculating the first probability of collision, of:

determining the time of closest approach corresponding to the real time of closest approach, by successively incrementing, from the reference time of closest approach predetermined by the information processing means on the ground and transmitted beforehand to the satellite, a time shift verifying, at the real time of closest approach, a result which is almost zero of the scalar product of a difference between a true orbital position of the satellite and an orbital position of the piece of space debris with a difference between a true orbital speed of the satellite and an orbital speed of the piece of space debris, the orbital position and the orbital speed of the satellite and respectively of the piece of space debris being obtained from the orbit of the satellite and respectively of the piece of space debris.

10. The method according to claim 6 for which the allocating step comprises the following steps:

determining a maximum possible radial separation between the satellite and the piece of space debris at the time of closest approach on each of the determined free manoeuvre time slots;

classifying the free manoeuvre time slots according to a rating representative of a radial separation determined for each free manoeuvre time slot;

the allocation step including the allocation to each avoidance manoeuvre of the free manoeuvre time slot with the best determined rating distinct from a free time slot allocated to another avoidance manoeuvre.

11. The method according to claim 10 for which each avoidance manoeuvre includes a maximum authorised speed difference during the free manoeuvre time slot allocated to each avoidance manoeuvre.

12. The method according to claim 10 for which each avoidance manoeuvre includes a direction relating to the maximum radial separation associated with the free manoeuvre time slot allocated to each avoidance manoeuvre.

13. A system for estimating collision between a satellite in orbit around the Earth and at least one piece of space debris, the system comprising information processing means on the ground configured for:

obtaining a reference orbit of the satellite and its covariance and an orbit of the piece of space debris and its covariance;

determining a reference time of closest approach;

determining at least one state transition matrix allowing propagation of the reference orbit of the satellite and its covariance between an activation time and a reference time of closest approach;

communicating to the satellite at least the following pieces of information: the activation time, the reference orbit of the satellite at the activation time and at the reference time of closest approach, the orbit of the piece of space debris and its covariance at the reference time of closest approach, and the state transition matrix;

calculation means on board the satellite configured for:
- determining in real time a true orbit of the satellite at the activation time by a navigation device of the satellite;
- propagating the true orbit of the satellite and its covariance up to the reference time of closest approach according to the state transition matrix, the reference orbit of the satellite at the reference time of closest approach, and an orbital difference between the true orbit and the reference orbit of the satellite at the activation time;
- calculating a first probability of collision between the satellite and the piece of space debris according to orbital positions of the satellite and of the piece of debris at a time of closest approach corresponding to the reference time of closest approach or to a real time of closest approach calculated by taking into account the true orbit of the satellite, so as to evaluate the need to modify the orbital trajectory of the satellite, each orbital position of the satellite and respectively of the piece of space debris being obtained from the orbit of the satellite and respectively of the piece of space debris.

\* \* \* \* \*